US010270807B2

United States Patent
Sysman et al.

(10) Patent No.: US 10,270,807 B2
(45) Date of Patent: Apr. 23, 2019

(54) DECOY AND DECEPTIVE DATA OBJECT TECHNOLOGY

(71) Applicant: Cymmetria, Inc., Palo Alto, CA (US)

(72) Inventors: Dean Sysman, Haifa (IL); Gadi Evron, Eli (IL); Imri Goldberg, Kfar-Netter (IL); Ran Harel, Oranit (IL); Shmuel Ur, Shorashim (IL)

(73) Assignee: Cymmetria, Inc., Palo Alto, CA (US)

( * ) Notice: Subject to any disclaimer, the term of this patent is extended or adjusted under 35 U.S.C. 154(b) by 0 days.

(21) Appl. No.: 15/746,411

(22) PCT Filed: Jul. 20, 2016

(86) PCT No.: PCT/IB2016/054306
§ 371 (c)(1),
(2) Date: Jan. 21, 2018

(87) PCT Pub. No.: WO2017/013589
PCT Pub. Date: Jan. 26, 2017

(65) Prior Publication Data
US 2018/0212995 A1   Jul. 26, 2018

Related U.S. Application Data

(60) Provisional application No. 62/194,863, filed on Jul. 21, 2015.

(51) Int. Cl.
*G06F 21/55* (2013.01)
*H04L 29/06* (2006.01)

(52) U.S. Cl.
CPC ........ *H04L 63/1491* (2013.01); *G06F 21/554* (2013.01); *H04L 63/1425* (2013.01)

(58) Field of Classification Search
USPC .......................................... 726/23
See application file for complete search history.

(56) References Cited

U.S. PATENT DOCUMENTS 6,567,808 B1 * 5/2003 Eschelbeck ............. G06F 9/465
8,181,250 B2 * 5/2012 Rafalovich ......... H04L 63/1491
713/187

(Continued)

FOREIGN PATENT DOCUMENTS

WO    WO 2017/013589    1/2017

OTHER PUBLICATIONS

Kuwatlyetal-2004; p51-kreibich; Rowe_Software_Decoys_Intrusion.*

(Continued)

*Primary Examiner* — Taghi T Arani
*Assistant Examiner* — Badridot Champakesanatusptodotgov

(57) ABSTRACT

A computer implemented method of detecting unauthorized access to a protected network by monitoring a dynamically updated deception environment, comprising launching, on one or more decoy endpoints, one or more decoy operating system (OS) managing one or more of a plurality of deception applications mapping a plurality of applications executed in a protected network, updating dynamically a usage indication for a plurality of deception data objects deployed in the protected network to emulate usage of the plurality of deception data objects for accessing the deception application(s) wherein the plurality of deception data objects are configured to trigger an interaction with the deception application(s) when used, detecting usage of data contained in the deception data object(s) by monitoring the interaction and identifying one or more potential unauthorized operations based on analysis of the detection.

17 Claims, 13 Drawing Sheets

(56) References Cited

U.S. PATENT DOCUMENTS

| | | | |
|---|---|---|---|
| 8,955,143 B1* | 2/2015 | Ramalingam | G06F 17/30864 713/161 |
| 9,621,568 B2* | 4/2017 | Shieh | H04L 63/1408 |
| 9,628,498 B1* | 4/2017 | Aziz | H04L 63/1408 |
| 9,838,427 B2* | 12/2017 | Quinlan | H04L 63/1491 |
| 2005/0204157 A1* | 9/2005 | Johnson | H04L 63/1491 726/22 |
| 2007/0271614 A1* | 11/2007 | Capalik | H04L 63/1441 726/23 |
| 2008/0016570 A1* | 1/2008 | Capalik | H04L 63/1408 726/23 |
| 2010/0077483 A1* | 3/2010 | Stolfo | G06F 21/554 726/24 |
| 2012/0255012 A1* | 10/2012 | Sallam | G06F 21/52 726/24 |
| 2012/0331553 A1* | 12/2012 | Aziz | G06F 21/554 726/23 |
| 2014/0096229 A1* | 4/2014 | Burns | H04L 63/1491 726/15 |
| 2015/0121529 A1* | 4/2015 | Quinlan | H04L 63/1491 726/23 |
| 2016/0088019 A1* | 3/2016 | Li | G06F 21/53 726/1 |
| 2017/0134423 A1* | 5/2017 | Sysman | G06F 21/554 |

OTHER PUBLICATIONS

International Preliminary Report on Patentability dated Feb. 1, 2018 From the International Bureau of WIPO Re. Application No. PCT/IB2016/054306. (16 Pages).

International Search Report and the Written Opinion dated Nov. 29, 2016 From the International Searching Authority Re. Application No. PCT/IB2016/054306. (12 Pages).

Restriction Official Action dated Oct. 25, 2018 From the US Patent and Trademark Office Re. U.S. Appl. No. 15/414,850. (9 pages).

* cited by examiner

DECOY AND DECEPTIVE DATA OBJECT TECHNOLOGY

RELATED APPLICATIONS

This application is a National Phase of PCT Patent Application No. PCT/IB2016/054306 having International filing date of Jul. 20, 2016, which claims the benefit of priority under 35 USC § 119(e) of U.S. Provisional Patent Application No. 62/194,863 filed on Jul. 21, 2015. The contents of the above applications are all incorporated by reference as if fully set forth herein in their entirety.

BACKGROUND

The present invention, in some embodiments thereof, relates to detecting potential unauthorized operations in a protected network, and, more specifically, but not exclusively, to detecting potential unauthorized operations in a protected network by monitoring interaction between dynamically updated deception data objects deployed in the protected system and deception applications hosted by a decoy endpoint.

Organizations of all sizes and types face the threat of being attacked by advanced attackers who may be characterized as having substantial resources of time and tools, and are therefore able to carry out complicated and technologically advanced operations against targets to achieve specific goals, for example, retrieve sensitive data, damage infrastructure and/or the like.

Generally, advanced attackers operate in a staged manner, first collecting intelligence about the target organizations, networks, services and/or systems, initiate an initial penetration of the target, perform lateral movement and escalation within the target network and/or services, take actions on detected objectives and leave the target while covering the tracks. Each of the staged approach steps involves tactical iterations through what is known in the art as observe, orient, decide, act (OODA) loop. This tactic may present itself as most useful for the attackers who may face an unknown environment and therefore begin by observing their surroundings, orienting themselves, then deciding on a course of action and carrying it out.

SUMMARY

According to an aspect of some embodiments of the present invention there is provided a computer implemented method of detecting unauthorized access to a protected network by monitoring a dynamically updated deception environment, comprising:

Launching, on one or more decoy endpoints, one or more decoy operating systems (OS) managing one or more of a plurality of deception applications mapping a plurality of applications executed in a protected network.

Updating dynamically a usage indication for a plurality of deception data objects deployed in the protected network to emulate usage of the plurality of deception data objects for accessing the one or more deception application. The deception data objects are configured to trigger an interaction with the one or more deception applications when used.

Detecting usage of data contained in one or more of the plurality of deception data objects by monitoring the interaction.

Identifying one or more potential unauthorized operations based on analysis of the detection.

The decoy endpoint is a member selected from a group consisting of: a physical device comprising one or more processors and a virtual machine.

The virtual machine is hosted by a local endpoint, a cloud service and/or a vendor service.

Each of the plurality of deception data objects emulates a valid data object used for interacting with the one or more applications.

Each of the plurality of deception data objects is a hashed credentials object, a browser cookie, a registry key, a Server Message Block (SMB) mapped share, a Mounted Network Storage element, a configuration file for remote desktop authentication credentials, a source code file with embedded database authentication credentials and/or a configuration file to a source-code version control system.

The usage indication comprises impersonating that the plurality of deception data objects are used to interact with the one or more deception applications.

The one or more potential unauthorized operation is initiated by a user, a process, an automated tool and/or a machine.

Each of the plurality of applications is an application, a tool, a local service and/or a remote service.

Each of the plurality of applications is selected by one or more of: a user and an automated tool.

The monitoring comprises one or more of:

Monitoring network activity of one or more of the plurality of deception applications.

Monitoring interaction of the one or more deception applications with the one or more decoy operating systems.

Monitoring one or more log records created by the one or more deception applications.

Monitoring interaction of one or more of the plurality of deception applications with one or more of a plurality of hardware components in the protected network.

Optionally, the one or more decoy operating system, the plurality of deception applications and/or the plurality of deception data objects are divided to a plurality of groups according to one or more characteristic of the protected network.

Optionally, a plurality of templates is provided for creating the one or more decoy operating system, the plurality of deception application and/or the plurality of deception data objects.

Optionally, each of the plurality of templates comprises a definition of a relationship between at least two of the one or more decoy operating system, the plurality of deception application and/or the plurality of deception data objects.

Optionally, one or more of the templates is adjusted by one or more users adapting the one or more templates according to one or more characteristic of the protected network.

Optionally, an alert is generated at detection of the one or more potential unauthorized operations.

Optionally, the alert is generated at detection of a combination of a plurality of potential unauthorized operations to detect a complex sequence of the interaction.

Optionally, the analysis comprises preventing false positive analysis to avoid identifying one or more legitimate operations as the one or more potential unauthorized operations.

Optionally, the one or more potential unauthorized operations are analyzed to identify an activity pattern.

Optionally, a learning process is applied on the activity pattern to classify the activity pattern in order to improve detection and classification of one or more future potential unauthorized operations.

According to an aspect of some embodiments of the present invention there is provided a system for detecting unauthorized access to a protected network by monitoring a dynamically updated deception environment, comprising a program store storing a code and one or more processor on one or more decoy endpoint coupled to the program store for executing the stored code. The code comprising:

Code instructions to launch one or more decoy operating systems (OS) managing one or more of a plurality of deception applications mapping a plurality of applications executed in a protected network.

Code instructions to update dynamically a usage indication for a plurality of deception data objects deployed in the protected network to emulate usage of the plurality of deception data objects for accessing the one or more deception applications. The plurality of deception data objects are configured to trigger an interaction with the one or more deception applications when used.

Code instructions to detect usage of data contained in one or more of the plurality of deception data objects by monitoring the interaction.

Code instructions to identify one or more potential unauthorized operations based on an analysis of the detection.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced In the drawings.

DETAILED DESCRIPTION

Figure 1:
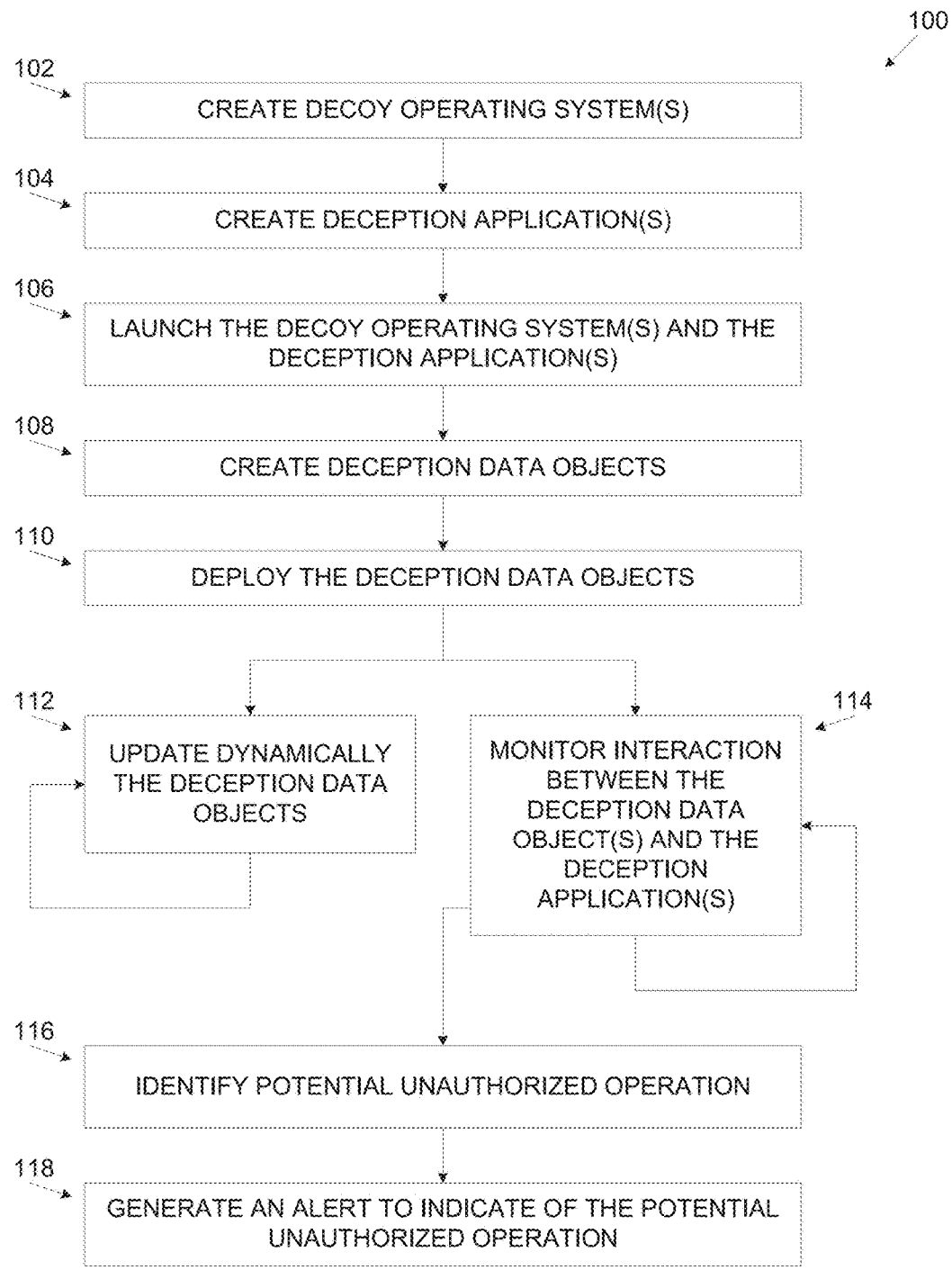
FIG. 1 is a flowchart of an exemplary process for creating and maintaining a deception environment in order to detect potential unauthorized operations in a protected network, according to some embodiments of the present invention.
Figure 2A:
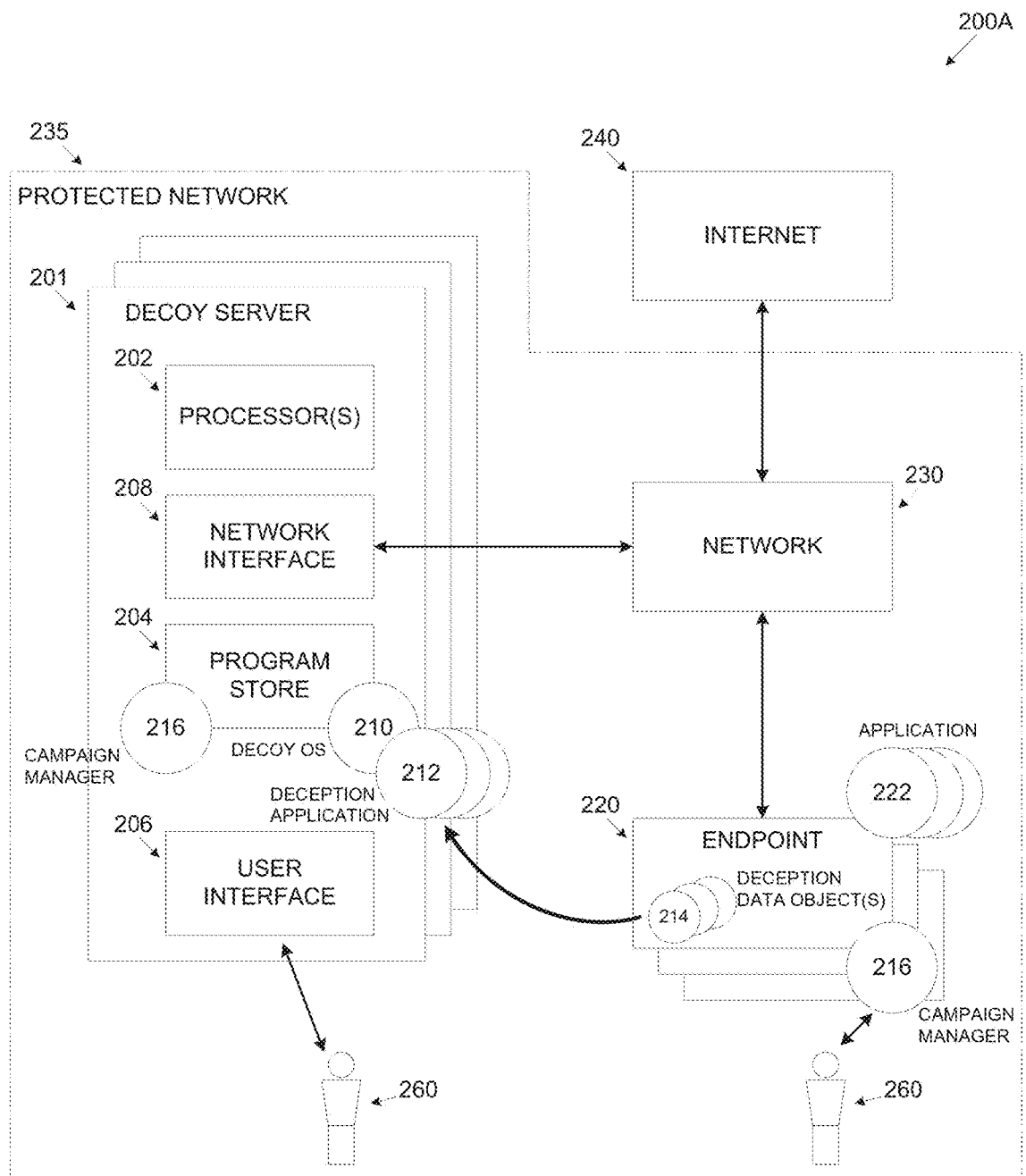
FIG. 2A is a schematic illustration of an exemplary first embodiment of a system for creating and maintaining a deception environment in order to detect potential unauthorized operations in a protected network, according to some embodiments of the present invention.
Figure 2B:
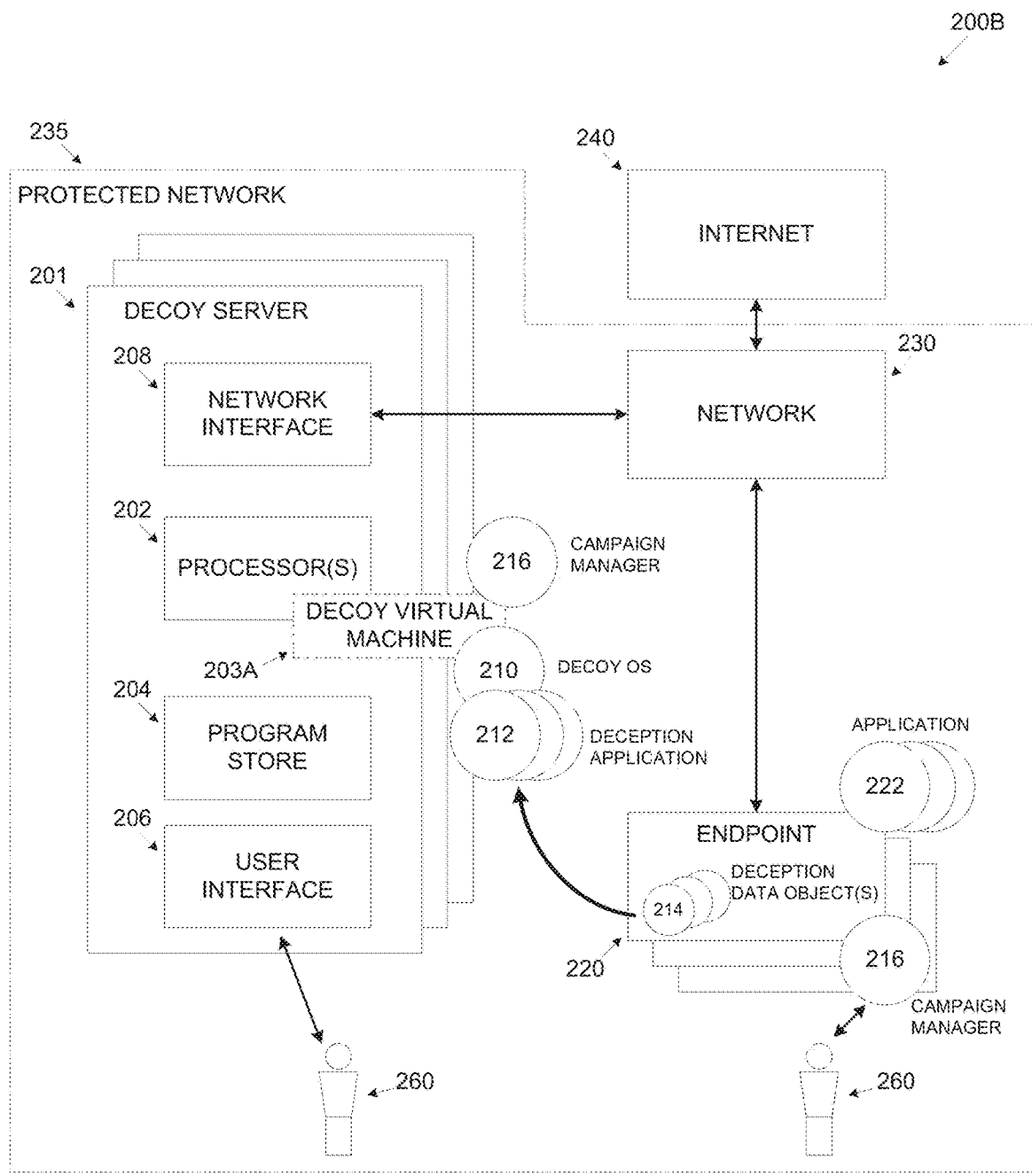
FIG. 2B is a schematic illustration of an exemplary second embodiment of a system for creating a deception environment for detecting potential unauthorized operations in a protected network, according to some embodiments of the present invention.
Figure 2C:
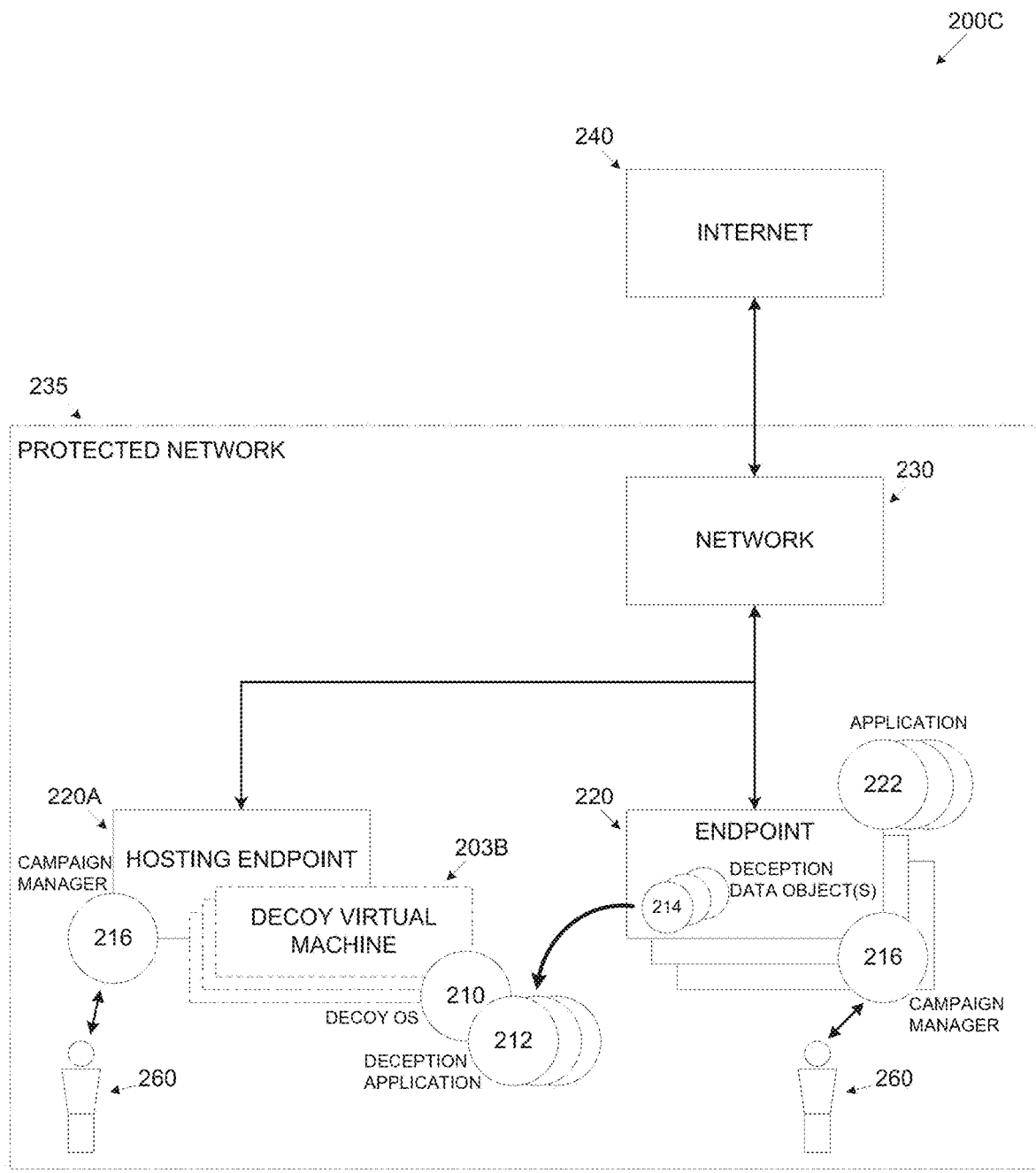
FIG. 2C is a schematic illustration of an exemplary third embodiment of a system for creating a deception environment for detecting potential unauthorized operations in a protected network, according to some embodiments of the present invention.
Figure 2D:
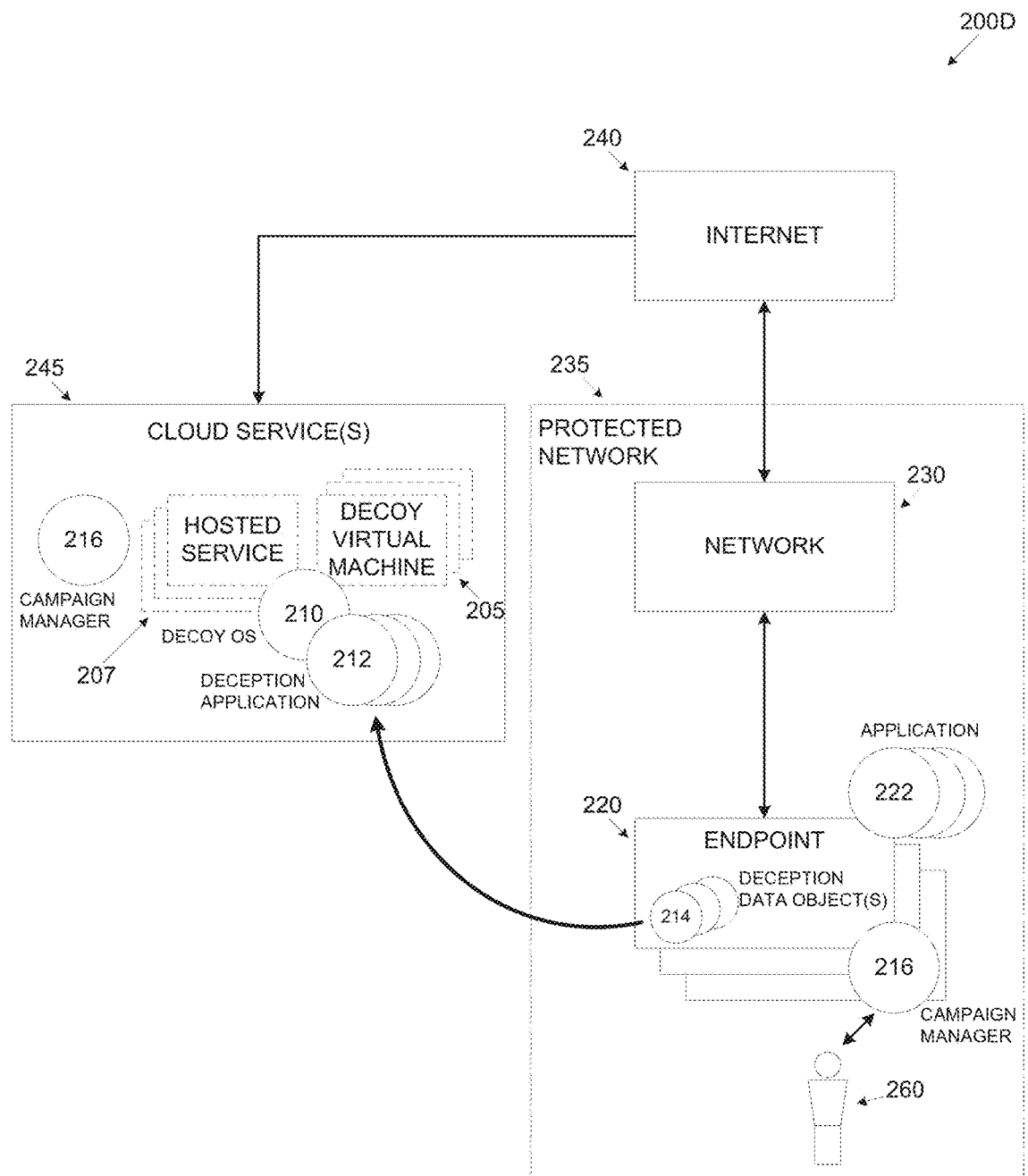
FIG. 2D is a schematic illustration of an exemplary fourth embodiment of a system for creating a deception environment for detecting potential unauthorized operations in a protected network, according to some embodiments of the present invention.
Figure 2E:
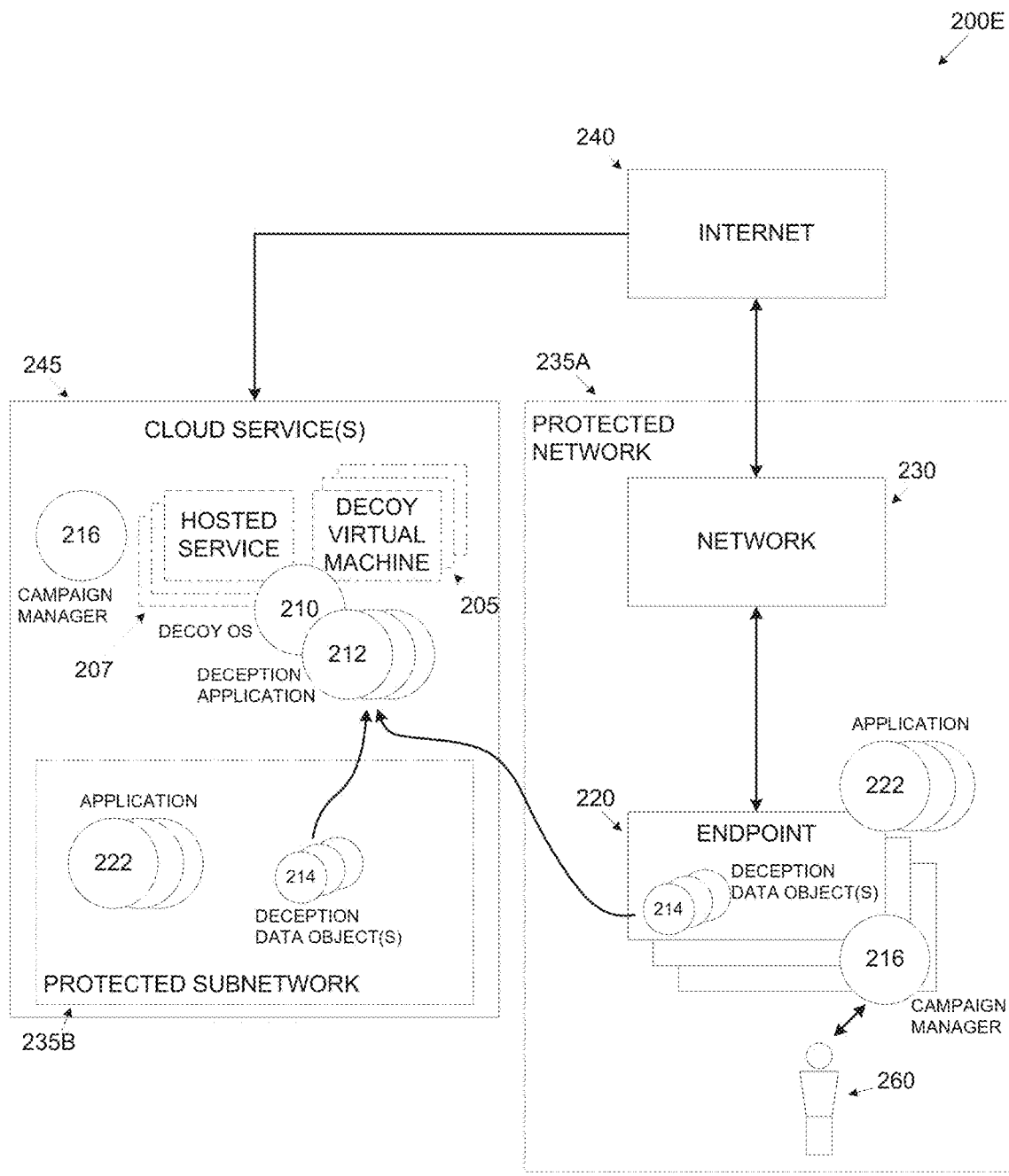
FIG. 2E is a schematic illustration of an exemplary fifth embodiment of a system for creating a deception environment for detecting potential unauthorized operations in a protected network, according to some embodiments of the present invention.
Figure 2F:
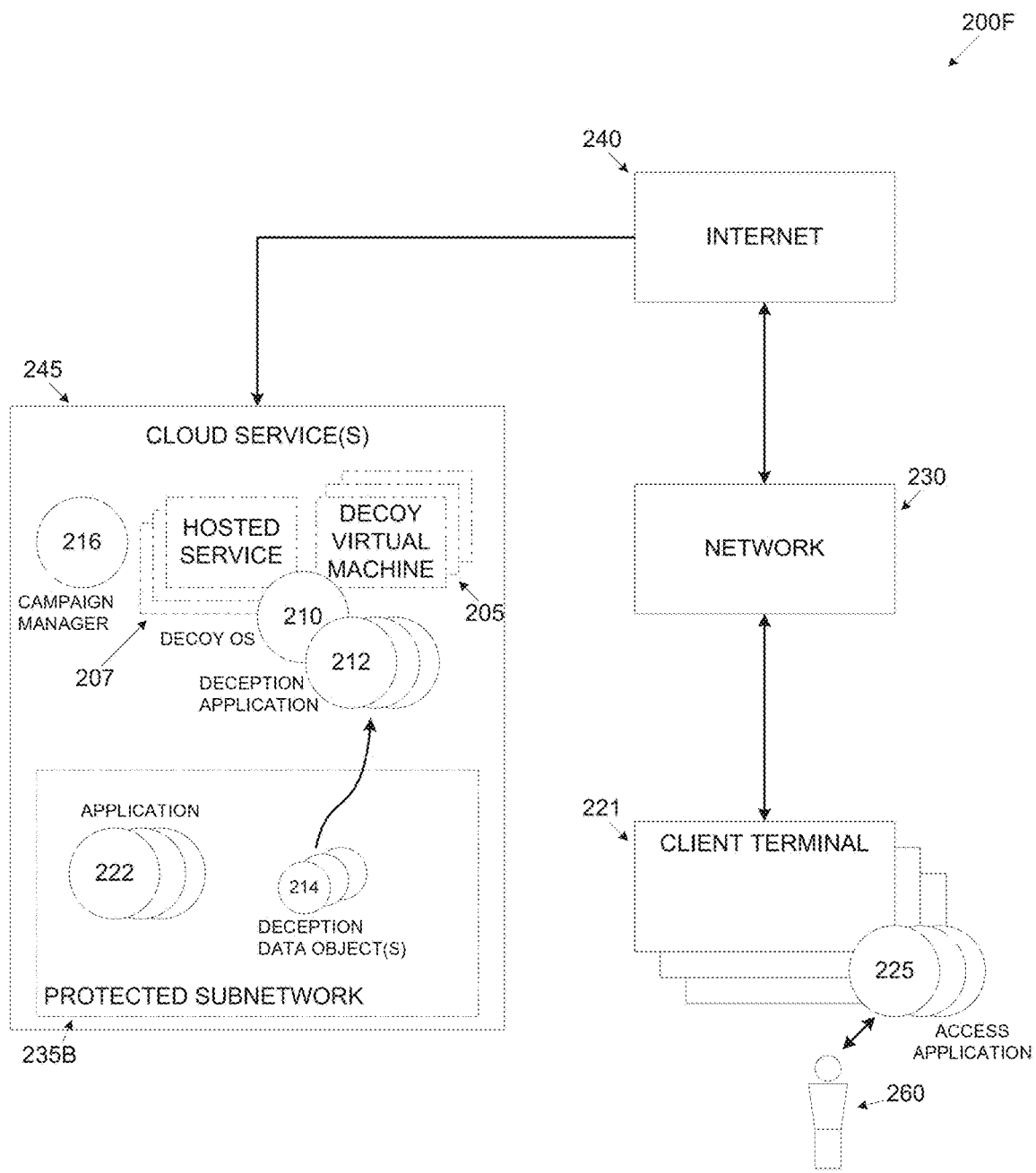
FIG. 2F is a schematic illustration of an exemplary sixth embodiment of a system for creating a deception environment for detecting potential unauthorized operations in a protected network, according to some embodiments of the present invention.

The present invention, in some embodiments thereof, relates to detecting potential unauthorized operations in a protected network, and, more specifically, but not exclusively, to detecting potential unauthorized operations in a protected network by monitoring interaction between dynamically updated deception data objects deployed in the protected system and deception applications hosted by a decoy endpoint.

According to some embodiments of the present invention, there are provided methods, systems and computer program products for creating an emulated deception environment to allow detection of potential unauthorized operations in a protected network. The deception environment is created, maintained and monitored through one or more deception campaigns each comprising a plurality of deception components. The deception environment co-exists with a real (valid) processing environment of the protected network while separated from the real processing environment. The deception environment is based on deploying deception data objects (breadcrumbs), for example, credential files, password files, share lists, "cookies", access protocols and/or the like in the real processing environment on one or more endpoints, for example, work stations, servers, processing nodes and/or the like in the protected network. The deception data objects interact with decoy operating system(s) (OS) and/or deception applications created and launched on one or more decoy endpoints in the protected system according to pre-defined relationship(s) applied in the deception environment. The decoy OS(s) and the deception application(s) may be adapted according to the characteristics of the real (valid) OS(s) and/or application used by the real processing environment of the protected network. The deception data objects are deployed to attract potential attacker(s) to use the deception data objects while observing, orienting, deciding and acting (OODA) within the protected network. In order for the deception environment to effectively mimic and/or emulate the real processing environment, the created deception data objects are of the same type(s) as valid data objects used in the real processing environment. However when used, instead of interacting with the real OS(s) and/or application(s), the deception data objects interact with the decoy OS(s) and/or the deception application(s). The interaction as well as general activity in the deception environment is constantly monitored and analyzed. Since the deception environment may be transparent to legitimate users, applications, processes and/or the like in the real processing environment, operation(s) in the protected network that uses the deception data objects may indicate that the operations(s) are potentially unauthorized operation(s) that may likely be performed by the potential attacker(s).

The deception environment is updated dynamically and continuously to make the deception data objects look like they are in use by the real processing environment in the protected network and therefore seem as valid data objects to the potential attacker thus leading the potential attacker to believe the emulated deception environment is a real one.

The provided methods, systems and computer program products further allow a user, for example, an IT person and/or a system administrator to create the deception environment using templates for the deception components, specifically, the decoy OS(s), the deception application(s) and the deception data object(s). Automated tools are provided to automatically create, adjust and/or adapt the deception environment according to the characteristics of the real processing environment and/or the protected network such that the deception environment maps the construction and/or operation of the real processing environment.

The emulated deception environment may present significant advantages compared to currently existing methods for detecting potential attackers and/or preventing the potential attackers from accessing resources in the protected network. First as opposed to some of the currently existing methods that engage with the potential attacker at the act stage, the presented deception environment deceives the potential attacker from the very first time the attacker enters the protected network by creating a false environment—the emulated deception environment. Engaging the attacker at the act stage and trying to block the attack may lead the attacker to search for an alternative path in order to circumvent the blocked path. Moreover, while the currently existing methods are responsive in nature, i.e. respond to operations of the attacker, by creating the false environment in which the attacker advances, the initiative is taken such that the attacker may be directed and/or led to trap(s) that may reveal him (them).

Some of the currently existing methods do try to deceive the attacker, however the measures used may be basic and/or simple, for example, obscurity, i.e. hiding the valuable data out of plain sight. Since advanced attacker(s) may have the time and resources to explore the target network, the attacker(s) is (are) likely to find the valuable data. More advanced currently existing methods employ a higher level of deception, mostly by using honeypots (computer security mechanisms set to detect, deflect and/or counteract unauthorized attempts to use information systems). The honeypots that are usually emulating services and/or systems are typically placed inside the target network(s) and/or at the edges. The honeypots are directed to attract the attacker to use them and generate an alert when usage of the honeypots is detected. The honeypots approach may provide some benefits when dealing with automated attack tools and/or unsophisticated attackers, however the honeypots present some drawbacks. First, the honeypots may be difficult to scale to large organizations as each of the honeypot application(s) and/or service(s) may need to be individually installed and managed. In addition, the advanced attacker may learn of the presence and/or nature of the honeypot since it may be static and/or inactive within the active target network. Moreover, even if the attack is eventually blocked, the honeypots may not be able to gather useful forensic data about the attack and/or the attacker(s). Furthermore, due to the unsophisticated nature of the honeypot in which alerts may be generated on every interaction with the honeypot, multiple false positive alerts may be generated when legitimate activity is conducted with the honeypot.

The presented deception environment may overcome the drawback of the currently existing deception methods by updating dynamically and constantly the deception environment such that the deception data objects appear to be used in the protected network. This may serve to create an impression of a real active environment and may lead the potential attacker(s) to believe the deception data objects are genuine (valid) data objects. As the potential attacker(s) may not detect the deception environment, he (they) may interact with the deception environment during multiple iterations of the OODA loop thus revealing his (their) activity pattern and possible intention(s). The activity pattern may be collected and analyzed to adapt the deception environment accordingly. Since the deception environment is transparent to legitimate users in the protected network, any operations involving the decoy OSs, the deception applications and/or the deception data objects may accurately indicate a potential attacker thus avoiding false positive alerts.

Moreover, the presented deception environment methods and systems may allow for high scaling capabilities over large organizations, networks and/or systems. Using the templates for creating the decoy OS(s) and/or the deception application(s) coupled with the automated tools to create and launch the decoy OS(s) and/or the deception application(s) as well as automatically deploy the deception data objects may significantly reduce the effort to construct the deception environment and improve the efficiency and/or integrity of the deception environment. The centralized management and monitoring of the deception environment may further simplify tracking the potential unauthorized operations and/or potential attacks.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart of an exemplary process for creating and maintaining a deception environment in order to detect potential unauthorized operations in a protected network, according to some embodiments of the present invention. A process 100 is executed to launch one or more deception campaigns comprising a plurality of deception components to create, launch, maintain and monitor a deception environment that co-exists with a real processing environment of a protected network. The deception components comprise one or more decoy OS(s) and deception application(s) adapted according to the characteristics of the OS(s) and/or applications used in the protected network. The decoy OS(s) and/or the deception application(s) are launched on one or more decoy endpoints that may be physical endpoint and/or virtual endpoints. The deception components further comprise a plurality of deception data objects (breadcrumbs) interacting with the decoy OS s and/or the deception applications. The deception data objects are deployed within the real processing environment of the protected network to attract potential attacker(s) to use the deception data objects while performing the OODA loop within the protected network. The deception data objects are of the same type(s) as valid data objects used to interact with the real OSs and/or applications in the real processing environment such that the deception environment efficiently emulates and/or impersonates as the real processing environment and/or a part thereof. When used, instead of interacting with the real operating systems and/or application, the deception data objects interact with the decoy OS(s) and/or the deception application(s). The deception environment is transparent to legitimate users, applications, processes and/or the like of the protected network's real processing environment. Therefore, operation(s) in the protected network that use the deception data object(s) may be considered as potential unauthorized operation(s) that in turn may be indicative of a potential attacker. The deception data objects are updated constantly and dynamically to avoid stagnancy and mimic a real and dynamic environment with the deception data objects appearing as valid data objects such that the potential attacker believes the emulated deception environment is a real one.

Reference is now made to FIG. 2A, FIG. 2B, FIG. 2C, FIG. 2D, FIG. 2E and FIG. 2F which are exemplary embodiments of a system for creating and maintaining a deception environment in order to detect potential unauthorized operations in a protected network, according to some embodiments of the present invention. One or more exemplary systems 200A, 200B, 200C, 200D, 200E and 200F may be used to execute a process such as the process 100 to launch one or more deception campaigns for detecting and/or alerting of potential unauthorized operations in a protected network 235. The deception campaign(s) include creating, maintaining and monitoring the deception environment in the protected network 235. While co-existing with the real processing environment of the protected network 235, the deception environment is separated from the real processing environment to maintain partitioning between the deception environment and the real processing environment.

The systems 200A, 200B, 200C, 200D, 200E and 200F include the protected network 235 that comprises a plurality of endpoints 220 connected to a network 230 facilitated through one or more network infrastructures, for example, a local area network (LAN), a wide area network (WAN), a personal area network (PAN), a metropolitan area network (MAN) and/or the internet 240. The protected network 235 may be a local protected network that may be a centralized single location network where all the endpoints 220 are on premises or a distributed network where the endpoints 220 may be located at multiple physical and/or geographical locations. The protected network 235 may further be a virtual protected network hosted by one or more cloud services 245, for example, Amazon Web Service (AWS), Google Cloud, Microsoft Azure and/or the like. The protected network 235 may also be a combination of the local protected network and the virtual protected network. The protected network 235 may be, for example, an organization network, an institution network and/or the like. The endpoint 220 may be a physical device, for example, a computer, a workstation, a server, a processing node, a cluster of processing nodes, a network node, a Smartphone, a tablet, a modem, a hub, a bridge, a switch, a router, a printer and/or any network connected device having one or more processors. The endpoint 220 may further be a virtual device hosted by one or more of the physical devices, instantiated through one or more of the cloud services 245 and/or provided as a service through one or more hosted services available by the cloud service(s) 245. Each of the endpoints 220 is capable of executing one or more real applications 222, for example, an OS, an application, a service, a utility, a tool, a process, an agent and/or the like. The endpoint 220 may further be a virtual device, for example, a virtual machine (VM) executed by the physical device. The virtual device may provide an abstracted and platform-dependent and/or independent program execution environment. The virtual device may imitate operation of the dedicated hardware components, operate in a physical system environment and/or operate in a virtualized system environment. The virtual devices may serve as a platform for executing one or more of the real applications 222 utilized as system VMs, process VMs, application VMs and/or other virtualized implementations.

The local protected networks 235 as implemented in the systems 200A and 200B further includes a decoy server 201, for example, a computer, a workstation, a server, a processing node, a cluster of processing nodes, a network node and/or the like serving as the decoy endpoint. The decoy server 201 comprises a processor(s) 202, a program store 204, a user interface 206 for interacting with one or more users 260, for example, an information technology (IT) person, a system administrator and/or the like and a network interface 208 for communicating with the network 230. The processor(s) 202, homogenous or heterogeneous, may include one or more processing nodes arranged for parallel processing, as clusters and/or as one or more multi core processor(s). The user interface 206 may include one or more human-machine interfaces, for example, a text interface, a pointing devices interface, a display, a touchscreen, an audio interface and/or the like. The program store 204 may include one or more non-transitory persistent storage devices, for example, a hard drive, a Flash array and/or the like. The program store 204 may further comprise one or more network storage devices, for example, a storage server, a network accessible storage (NAS), a network drive, and/or the like. The program store 204 may be used for storing one or more software modules each comprising a plurality of program instructions that may be executed by the processor(s) 202 from the program store 204. The software modules may include, for example, a decoy OS 210 and/or a deception application 212 that may be created, configured and/or executed by the processor(s) 202 to emulate a processing environment within the protected network 235. The decoy OS(s) 210 and/or the deception application(s) 212 may be executed by the processor(s) 202 in a naive implementation as shown for the system 200A and/or over a nested decoy VM 203A hosted by the decoy server 201 as shown for the system 200B and serving as the decoy endpoint. The software modules may further include a deception campaign manager 216 executed by the processor(s) 202 to create, control and/or monitor one or more deception campaigns to crate the deception environment to detect potential unauthorized operations in the protected network 235.

The user 260 may use the campaign manager 216 to create, adjust, configure and/or launch one or more of the decoy OSs 210 and/or the deception application 212 on one or more of the decoy endpoints. The decoy endpoints are set to emulate the real endpoints 220 and as such may be physical and/or virtual endpoints. The user 260 may further use the campaign manager 216 to create, deploy and/or update a plurality of deception data objects 214 (breadcrumbs) deployed on one or more of the endpoints 220 in the protected network 235. The deployed deception data objects 214 interact with respective one or more of the deception applications 212. The deception data objects 214 are deployed to tempt the potential attacker(s) attempting to access resource(s) in the protected network 235 to use the deception data objects 214. The deception data objects 214 are configured to emulate valid data objects that are available in the endpoints 220 for interacting with applications 222.

The user 260 may interact with one or more of the software modules such as the campaign manager 216, the decoy OS(s) 210 and/or the deception application(s) 212 using the user interface 206. The user interface may include, for example, a graphic user interface (GUI) utilized through one or more of the human-machine interface(s).

Optionally, the user 260 interacts with the campaign manager 216, the decoy OS(s) 210 and/or the deception application(s) 212 remotely over the network 230 by using one or more applications, for example, a local agent and/or a web browser executed on one or more of the endpoints 220 and/or from a remote location over the internet 240.

Optionally, the user 260 executes the campaign manager 216 on one or more of the endpoints 220 to create, control and/or interact with the decoy OS 210 and/or the deception applications 212 over the network 230.

Optionally, for the local protected networks 235 as implemented in the system 200C, the decoy OS(s) 210 and/or the deception application(s) 212 may be executed as one or more decoy VMs 203B serving as the decoy endpoint(s) over a virtualization infrastructure available by one or more hosting endpoints 220A such as the endpoints 220 of the protected network 235. The virtualization infrastructure may utilize, for example, Elastic Sky X (ESXi), XEN, Kernel-based Virtual Machine (KVM) and/or the like. The user 260 may interact with the campaign manager 216, the decoy OS(s) 210 and/or the deception application(s) 212 through a user interface such as the user interface 206 provided by the hosting endpoint(s) 220A. Additionally and/or alternatively, the user 260 may use one or more applications, for example a local agent and/or a web browser executed on one or more of the endpoints 220 to interact remotely over the network 230 with the campaign manager 216, the decoy OS(s) 210 and/or the deception application(s) 212 executed by the hosting endpoint(s) 220A. Optionally, one or more of the other endpoints 220 executes the campaign manager 216 that interacts with the hosting endpoint(s) 220A OS 210 and/or the deception applications 212 over the network 230.

Optionally, for the local protected networks 235 as implemented in the system 200D, the decoy OS(s) 210 and/or the deception application(s) 212 may be executed through computing resources available from the one or more cloud services 245 serving as the decoy endpoint(s). The decoy OS(s) 210 and/or the deception application(s) 212 may be utilized as one or more decoy VMs 205 instantiated using the cloud service(s) 245 and/or through one or more hosted services 207, for example, software as a service (SaaS), platform as a service (PaaS) and/or the like that may be provided by the cloud service(s) 245. The campaign manager 216 may also be available through the cloud services 245. Optionally, the hosted service(s) 207 is provided by the vendor of the campaign manager 216.

The user 260 may use one or more applications, for example, a the local agent and/or a the web browser executed on one or more of the endpoints 220 to interact remotely over the network 230 and the internet 240 with the campaign manager 216. Optionally, the user 260 executes the campaign manager 216 on one or more of the endpoints 220 and interacts with the decoy OS(s) 210 and/or the deception application(s) 212 over the network 230 and the internet 240.

Optionally, as presented in the systems 200E and 200F, the protected network 235 and/or a part thereof is a virtual protected network that may be hosted and/or provided through the cloud service(s) 245. As a growing trend, many organizations may transfer and/or set their infrastructure comprising one or more of the applications 222, for example, a webserver, a database, an internal mail server, an internal web application and/or the like to the cloud, for example, through the cloud service(s) 245. In the system 200E, the protected network 235 may distributed to two or more subnetworks such as the networks 235A and 235B that are part of the same logical protected network 235 while they may be physically distributed at a plurality of sites as a combination of the local network and the virtual network. In the system 200F, the protected network 235 is virtual, hosted and/or provided by the cloud service 245, i.e. the protected network 235 comprises of only the subnetwork 235B. The subnetwork 235A is a local network similar the network 235 as described before for the systems 200A-200D and may include one or more of the endpoints 220 either as the physical devices and/or the virtual devices executing the application(s) 212. The network 235B on the other hand is a virtual network hosted and/or provided through the cloud service(s) 245 as one or more, for example, private networks, virtual private clouds (VPCs), private domains and/or the like. Each of the private cloud(s), private network(s) and/or private domain(s) may include one or more virtual endpoints 220 that may be, for example, instantiated through the cloud service(s) 245, provided as the hosted service 207 and/or the like, where each of the endpoints 220 may execute one or more of the applications 212. In such configuration(s), the decoy OS(s) 210 may be executed as independent instance(s) deployed directly to the cloud service(s) 245 using an account for the cloud service 245, for example, AWS, for a VPC provided by the AWS for use for the organizational infrastructure.

Typically, users of the virtual protected network 235 may remotely access, communicate and/or interact with the applications 212 by using one or more access applications 225, for example, the local agent, a local service and/or the web browser executed on one or more of the endpoints 220 and/or one or more client terminals 221. The client terminal 221 may include, for example, a computer, a workstation, a server, a processing node, a network node, a Smartphone, a tablet.

For both systems 200E and/or 200F, the decoy OS(s) 210 and/or the deception application(s) 212 may be executed through computing resources available from the cloud services 245 similarly to the system 200D that serve as the decoy endpoint(s). In the same fashion, the campaign manager 216 may be executed and accessed as described for the system 200D. The deception data objects 214 may be adapted and/or adjusted in the systems 200E and/or 200F according to the characteristics of the protected networks 235A and/or 235B with respect to the executed applications 222 and/or interaction with the user(s) of the applications 222.

For brevity, the protected networks 235, 235A and 235B are referred herein after as the protected network 235 whether implemented as the local protected networks 235, as the virtual protected network, and/or as a combination of the two.

Reference is made once again to FIG. 1. The process 100 may be executed using one or more software modules such as the campaign manager 216 to launch one or more deception campaigns. Each deception campaign comprises creating, updating and monitoring the deception environment in the protected network 235 in order to detect and/or alert of potential attackers accessing the protected network 235. Each deception campaign may be defined according a required deception scope and is constructed according to one or more characteristics of the protected network 235 processing environment.

In order to launch effective and/or reliable deception campaigns, the deception environment may be designed, created and deployed to follow design patterns, which are general reusable solutions to common problems and are in general use. The deception campaign may be launched to emulate one or more design patterns and/or best-practice solutions that are widely used by a plurality of organizations. For example, a virtual private network (VPN) link may exist to connect to a resource of the protected network 235, for example, a remote branch, a database backup server and/or the like. The deception campaign may be created to include one or more decoy OSs 210, deception applications 212 and respective deception data objects 214 to emulate the VPN link and/or one or more of the real resources of the protected network 235. Using this approach may give a reliable impression of the deception environment to appear as the real processing environment thus effectively attracting and/or misleading the potential attacker who may typically be familiar with the design patterns.

Each deception campaign may define one or more groups to divide and/or delimit the organizational units in order to create an efficient deception environment that may allow better classification of the potential attacker(s). The groups may be defined according to one or more organizational characteristics, for example, business units of the organization using the protected network 235, for example, human resources (HR), sales, finance, development, IT, data center, retail branch and/or the like. The groups may also be defined according to one or more other characteristics of the protected network 235, for example, a subnet, a subdomain, an active directory, a type of application(s) 222 used by the group of users, an access permission on the protected network 235, a user type and/or the like.

As shown at 102, the process 100 for launching one or more deception campaigns starts with the user 260 using the campaign manager 216 to create one or more images of the decoy OSs 210. The decoy OS 210 is a full stack operating system that contains baseline configurations and states that are relevant to the protected network 235 in which the decoy OS(s) 210 is deployed. The image of the decoy OS(s) 210 is selected according to one or more characteristics of the protected network 235, for example, a type of OS(s), for example, Windows, Linux, CentOS and/or the like deployed on endpoints such as the endpoints 220, a number of endpoints 220 and/or the like. The decoy OS(s) 210 may also be selected according to the deception application(s) 212 that the user 260 intends to use in the deception environment and are to be hosted by the decoy OS(s) 210.

Optionally, the campaign manager 216 provides one or more generic templates for creating the image of the decoy OS(s) 210. The templates may support one or more of a plurality of OSs, for example, Windows, Linux, CentOS and/or the like. The template(s) may be adjusted to include one or more applications and/or services such as the application 212 mapping respective applications 222 according to the configuration of the respective OS(s) in the real processing environment of the protected network 235. The adjusted template(s) may be defined as a baseline idle state of the images of the decoy OS(s) 210. The application(s) 212 included in the idle template may include, for example, generic OS applications and/or services that are part of the out-of-the-box manifest of services, as per the OS, for example, "explorer.exe" for the Windows OS. The application(s) 212 included in the idle state image may also include applications and/or services per the policy applied to the protected network 235, for example, an organization policy. The adjustment to the template may be done by the user 260 through the campaign manager 216 GUI and/or using one or more automated tools that analyze the endpoints 220 of the protected network 235 to identify application(s) 222 that are installed and used at the endpoints 220.

Optionally, the campaign manager 216 supports defining the template(s) to include orchestration, provisioning and/or update services for the decoy OS(s) 210 to ensure that the instantiated templates of the decoy OS(s) 210 are up-to-date with the other OS(s) deployed in the protected network 235.

As shown at 104, the user 260 using the campaign manager 216 creates one or more of the deception applications 212 to be hosted by the decoy OS(s) 210. The deception applications 212 include a manifest of applications, services, tools, processes and/or the like selected according to applications and services such as the applications 222 characteristic to the protected network 235. The deception applications 212 may be selected based on a desired scope of deception and/or characteristic(s) of the protected network 235. The deception application(s) 212 are selected to match deception data objects such as the deception data objects 214 deployed in the endpoints 220 to allow interaction between the deception data objects 214 and the respective deception application(s) 212. The selection of the deception applications 212 may be done by the user 260 using the campaign manager 216. Optionally, the campaign manager 216 may use one or more automated tools to explore the protected network 235 and identify the applications 222 executed on the endpoints 220. Based on the identified applications 222, the campaign manager may select automatically the deception applications(s) 212 to be included in the deception environment. The application(s) 212 may include one or more applications and/or services mapping respective application(s) 222, for example, an off-the-shelf application, a custom application, a web based application and/or service, a remote service and/or the like. Naturally, the applications 212 are selected to operate with the decoy OS(s) 210 selected for the deception campaign.

Optionally, the campaign manager 216 provides one or more generic templates for one or more of a plurality of deception applications 212. The templates of the deception applications 212 may be adjusted to adapt to the protected network 235 to maintain similarity of the deception environment with the real processing environment of the protected network such that the deception application(s) 212 appear to be valid applications such as the applications 222.

The campaign manager 216 may create, define and/or adjust the off-the-shelf application(s) for the deception environment through tools, packages and/or services customized to manipulate the off-the-shelf application(s). The campaign manager 216 may also use an Application Programming Interface (API) of a respective off-the-shelf application to create, define and/or adjust the template for creating the deception application 212 mapping the off-the-shelf application(s). The API may provide a record, for example, an XML file that describes the expected inputs and/or outputs of the off-the-shelf application available as a containerized application, a service and/or an executable. The record may further describe expected interaction of the off-the-shelf application with the OS in idle state(s), i.e. with no user interaction. The campaign manager 216 may use the interaction description of the off-the-shelf application with the OS to adjust the template of the respective deception application 212 to operate with the decoy OS 210. Defining the idle state(s) may allow the campaign manager 216 to detect user interaction once the deception campaign is launched. Containerization and declaration may be required for the custom applications to allow the campaign manager 216 to take advantage of the template mechanism for use with the custom application(s).

The campaign manager 216 may use the API of the web based application(s) and/or service(s) and the remote service(s) similarly to what is done for the off-the-shelf application(s) and/or service(s) to define the expected inputs, outputs, web responses and/or back-end data structures.

The campaign manager 216 defines relationship(s) between each of the deception applications 212 and the respective decoy OS(s) 210 to set the processing interaction between them during the deception campaign. The relationship(s) may be based on pre-defined declarations provided by the templates according to the type of the respective deception application 212 and the corresponding decoy OS 210. The relationship declarations may be further adjusted automatically by the campaign manager 216 and/or the by the user 260 using the campaign manager 216 to adapt to one or more operational, structural and/or organization characteristics of the protected network. The operational, structural and/or organization characteristics may include, for example, a network structure of the protected network, a mapping method of the application(s) 222 used in the protected network and/or the like.

For configurations of the virtual protected network 235 configurations as described in the systems 200E and/or 200F, the deception environment may be further created and/or adapted to emulate one or more applications and/or services such as the applications 222 that are provided by the cloud services 245. The applications 222 that are provided by the cloud services 245 may not be directly associated with the decoy OSs 210 but may rather be considered as decoy entities on their own.

For example, cloud services 245, such as, for example the AWS may provide an application 222 of type Simple Storage Service (S3) bucket service. The S3 bucket service has become a basic building block of any cloud deployment to the AWS. The S3 bucket service is used extensively for a plurality of storage purposes, for example, a dumb storage of large amounts of logs, an intermediate storage for software deployment, an actual storage mechanism used by web application(s) to store files and/or the like. The S3 bucket service provided by the AWS establishes a new bucket storage concept by providing an API allowing extensive capabilities and operability for the S3 bucket service, for example, monitoring of action(s) on the S3 bucket either read and/or write operations. This may serve to extend the deception environment to take advantage of the S3 bucket as a decoy, i.e. an S3 storage decoy. The S3 storage decoy may be created and deployed as an active part of the deception environment.

As shown at 106, the campaign manager 216 is used to launch the decoy OS(s) 210 and the deception application(s) 212. The decoy OS(s) 210 is instantiated in one or more forms as presented for the systems 200A, 200B, 200C, 200D, 200E and/or 200F. The instantiation of the decoy OS(s) 210 may be defined by the configuration of the groups declared for the deception campaign as well as by the configuration of the protected network. The instantiation of the decoy OS(s) 210 over the dedicated decoy server 201 and/or the virtualization infrastructure, for example, ESXi, XEN and/or KVM such as the decoy virtual machine(s) 203B and/or 205 and/or the hosted service(s) 207 may be done manually by the user 260 and/or automatically using the campaign manager 216.

As shown at 108, the campaign manager 216 is used to create the deception data objects 214 and define the interaction with one or more of the deception applications 212 by declaring the relationship(s) of each of the deception data objects 214. The deception data objects 214 are created to emulate valid data objects used to interact with the application 222. The deception data objects 214 may include, for example, one or more of the following:

Hashed credentials in Windows 7 user workstations.
Browser cookies to a web application or site.
Windows registry keys referencing remote application settings.
Server Message Block (SMB) mapped shares on a Windows machine.
Mounted Network Storage element(s) on a Linux workstation.
Configuration files referencing remote desktop authentication credentials.
Source code files with embedded database authentication credentials.
Configuration files to source-code version control system such as, for example, Git.

The deception data objects 214 are directed, once deployed, to attract the potential attackers during the OODA process in the protected network. To create an efficiently deceptive campaign, the deception data objects 214 may be created with one or more attributes that may be attractive to the potential attacker, for example, a name, a type and/or the like. The deception data objects 214 may be created to attract the attention of the attacker using an attacker stack, i.e. tools, utilities, services, application and/or the like that are typically used by the attacker. As such, the deception data objects 214 may not be visible to users using a user stack, i.e. tools, utilities, services, application and/or the like that are typically used by a legitimate user. Taking this approach may allow creating the deception campaign in a manner that the user may need to go out of his way, perform unnatural operations and/or actions to detect, find and/or use the deception data objects 214 while it may be a most natural course of action or method of operation for the attacker. For example, browser cookies are rarely accessed and/or reviewed by the legitimate user(s). At most, the cookies may be cleared en-masse. However, one of the main methods for the attacker(s) to obtain website credentials and/or discover internal websites visited by the legitimate user(s) is to look for cookies and analyze them. As another example, open shares that indicate shares with network resources made by the legitimate user(s) using the application(s) 212 is typically not available for the user stack while it is a common method for the attacker that may review them using, for example, a "net use" command from a shell. Other examples include, for example, web browsers history logs, files in temporary folders, shell command history logs, etc. that are typically not easily accessible using the user stack while they are easily available using the attacker stack.

Each of the deception data objects 214 is configured to interact with one or more of the decoy OSs 210 and/or the deception applications 212. The deception data objects 214 may be created and their relationships defined according to the deception policy and/or methods defined for the deception campaign. Naturally, the deception policy and/or methods that dictate the selection and configuration of the deception application(s) 212 also dictate the type and configuration of the deception data objects 214. The deception data objects 214 may further be created according to the groups defined for the deception campaign. For example, the deceptive data object 214 of type "browser cookie" may be created to interact with a website and/or an application launched using an application 212 of type "browser" created during the deception campaign. As another example, a deceptive data object 214 of type "mapped share" may be created to interact with an application 212 of type "share service" created during the deception campaign.

The deception data objects 214 may be created and/or adapted according to the configuration of the protected network 235 and/or the construction of the deception environment. As an example, it is assumed that the deception campaign is launched to create the deception campaign for the virtual protected network 235 as described in the systems 200E and/or 200F. The deception environment may be created to place a stronger focus on standard network setup, for example, remote access using Secure Shell (SSH), remote backup using SSH and/or Secure Copy (SCP), SSH using private keys (Privacy-enhanced Electronic Mail (PEM) files) and/or the like. Focusing on the standard network setup for these configuration(s) is done as opposed to for, example, user/password combinations deception data objects 214 created for the deception environment for the local implementation of the protected network 235 as described in the systems 200A-200D.

For configurations of the virtual protected network 235 configurations as described in the systems 200E and/or 200F, the deception data objects 214 may be created and deployed to interact with one or more deception applications 212 emulating one or more applications and/or services such as the applications 222 that are provided by the cloud services 245. For example, the deception data objects 214 may be created and deployed to interact with the S3 storage decoy. Due to regulation, it is common practice to encrypt the data that is stored through the S3 bucket service in order to protect the stored data from breaches that may be initiated by the cloud provider, for example, Amazon. The decryption key(s) may be stored at the same storage mechanism, for example, the AWS S3 bucket service however, in order to increase the security level, the decryption key(s) are typically stored through a storage bucket service provided by one or more other cloud providers, for example, the Google Cloud Engine. The campaign manager 216 may be used to create an S3 storage decoy that may store data that is set to attract the attacker. Deception data object(s) 214 of a type decryption key may be created to interact with the S3 storage decoy. The decryption key deception data object(s) 214 may be deployed using the storage mechanism of the same cloud service(s) provider providing the S3 storage decoy and/or using the storage mechanism of the of one or more of the other cloud service(s) providers. This deception extension that takes advantage of the S3 bucket service may seem highly realistic, valid and attractive to the potential attacker seeking to obtain the encrypted data available at the supposedly valid S3 storage decoy.

As shown at 110, the campaign manager 216 is used to deploy the deception data objects 214 on one or more of the endpoints 220 in the protected network 235 to attract the potential attackers who attempt to OODA the protected network 235.

The deployment of the deception data objects 214 may be done using the groups' definition. For example, the deceptive data object 214 of the type "browser cookie" may be deployed using a Group Policy Login Script throughout a respective network segment comprising a subset of the endpoints 220. As another example, the deceptive data object 214 of the type "mapped share" may be deployed using a Windows Management Instrumentation (WMI) script to a specific subset of endpoints 220 in the domain of the protected network 235. The deception data objects 214 may be deployed using automated tools, for example, provisioning and/or orchestration tools, for example, Group Policy, Puppet, Chef and/or the like. The deployment of the deception data objects 214 may also be done using local agents executed on the endpoints 220. The local agents may be pre-installed on the endpoints 220 and/or they may be volatile agents that install the deception data objects 214 and then delete themselves. The deception environment and/or the campaign manager 216 may provide custom scripts and/or commands that may be executed by the user 260 in the protected network 235 to deploy the deception data objects 214.

As discussed before, the campaign manager 216 provides a GUI to allow the user 260 to create, configure, launch and/or deploy one or more of the deception components. The GUI may be provided by the campaign manager 216 locally when the user 260 interacts directly with the decoy server 201 and/or the decoy VM 203A. However the campaign manager 216 may perform as a server that provides the GUI to the user 260 through one or more applications for accessing the campaign manager 216 remotely, for example, the local agent and/or a the web browser executed on one or more of the endpoints 220.

Figure 3A:
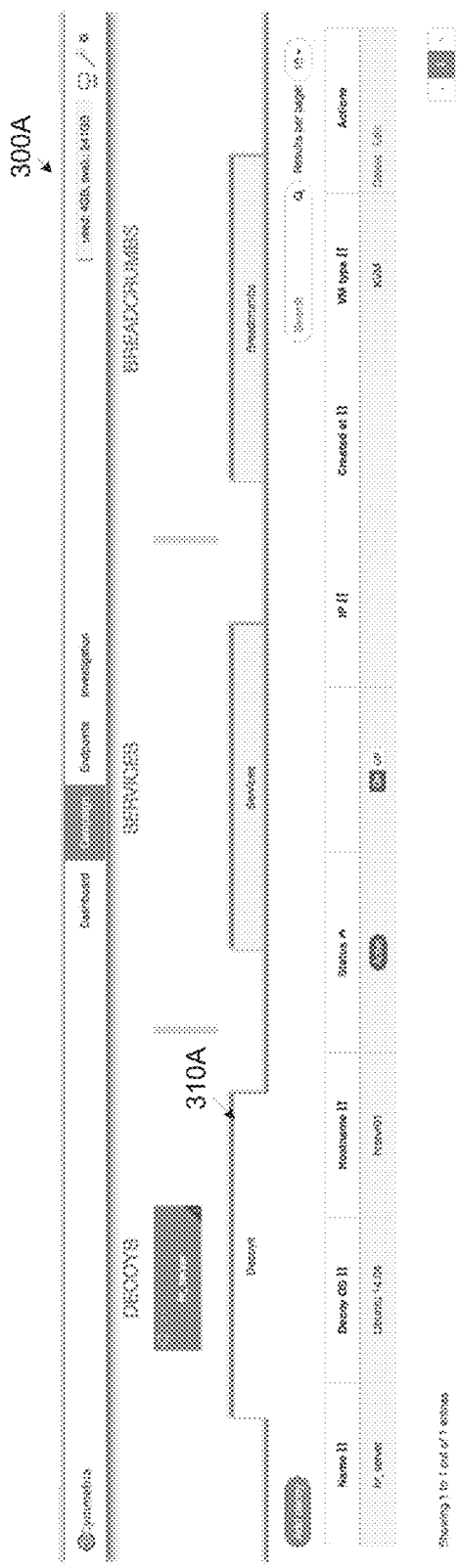
FIG. 3A is a screenshot of an exemplary first configuration screen of a campaign manager for configuring a deception campaign, according to some embodiments of the present invention.
Figure 3B:
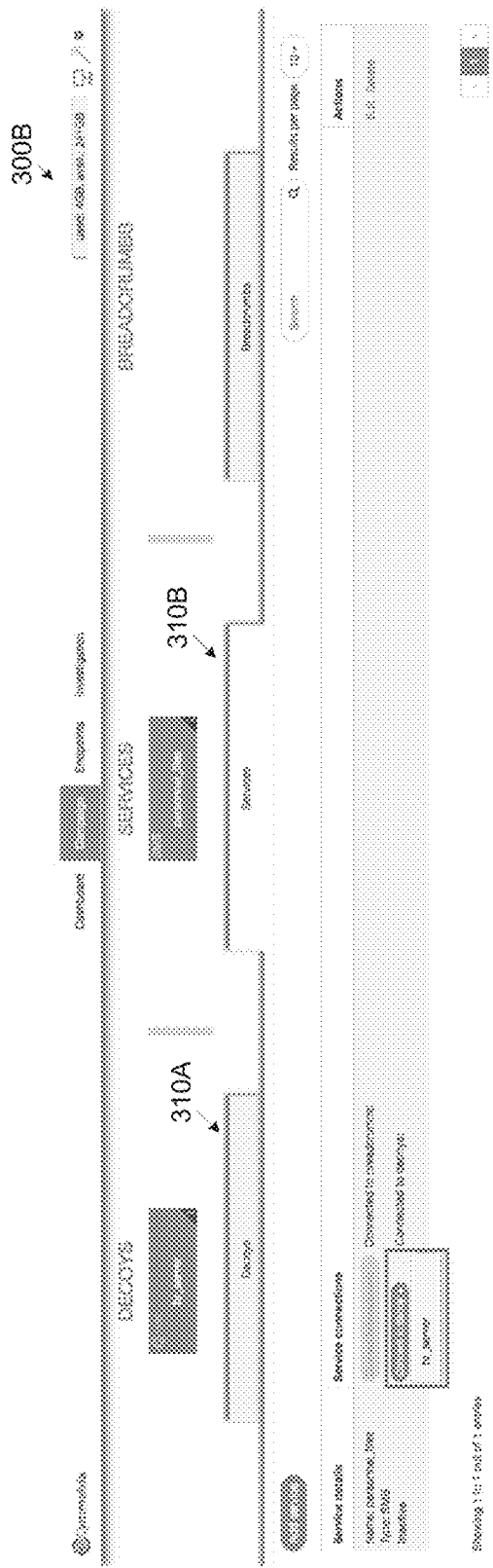
FIG. 3B is a screenshot of an exemplary second configuration screen of a campaign manager for configuring a deception campaign, according to some embodiments of the present invention.
Figure 3C:
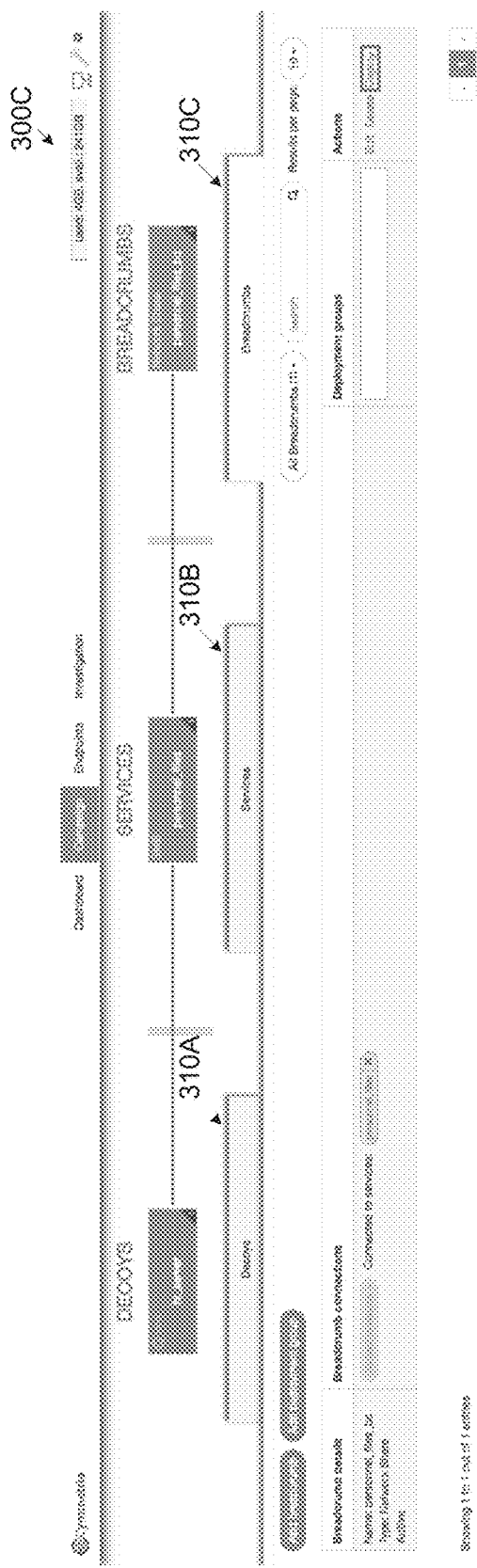
FIG. 3C is a screenshot of an exemplary third configuration screen of a campaign manager for configuring a deception campaign, according to some embodiments of the present invention.

Reference is now made to FIG. 3A, FIG. 3B and FIG. 3C, which are screenshots of an exemplary configuration screen of a campaign manager for configuring a deception campaign, according to some embodiments of the present invention. Screenshots 300A, 300B, 300C and 300D may be presented to one or more users such as the user 260 through a GUI of a campaign manager such as the campaign manager 216. The GUI allows the user 260 to create and/or launch a deception campaign by creating, configuring and launching one or more deception components such as the decoy OS(s) 210, the deception application(s) 212 and/or the deception data objects (breadcrumbs) 214. The campaign manager 216 may use pre-defined templates that may be adjusted according to the protected network 235 characteristics in order to create the deception components.

The screen shot 300A presents an interface for creating one or more images of the decoy OS(s) 210. The user 260 may select a decoys tab 310A to create one or more images of the decoy OS(s). Once the user 260 selects the decoys tab 310A the campaign manager 216 presents an interface for creating an image for the decoy OS 210 to allow the user 260 to select an OS template, for example, Linux, Windows, CentOS and/or the like for creating an image for the decoy OS 210. The user 260 may further assign a name designating the decoy OS 210 image and/or a host where the decoy OS 210 will be launched. As shown in the exemplary screenshot 300A, the user 260 selected a template of Linux Ubuntu to create an image for a decoy OS 210 designated "HR_Server" that is hosted by an endpoint 220 designated "hrsrv01".

The screen shot 300B presents an interface for creating one or more deception applications 212. The user 260 may select a services tab 310B to create one or more deception applications 212. Once the user 260 selects the services tab 310B the campaign manager 216 presents an interface for creating one or more deception applications 212 to allow the user 260 to select a template for creating the deception application(s) 212. The user 260 may further assign a name designating the created deception application 212 and/or define a relationship (interaction) between the created deception application 212 and one or more of the decoy OSs 210. As shown in the exemplary screenshot 300B, the user 260 selected a template of an SMB service for a deception application 212 designated "Personnel_Files" that is included in a services group designated "HR_Services" and connected to the decoy OS 210 "HR_Server". Through the interface, the user 260 may activate/deactivate the selected deception application 212. The interface may be further used to display the deception data objects that are attached (interact) to the created deception application 212.

The screenshot 300C presents an interface for creating one or more deception data objects (breadcrumbs) 214. The user 260 may select a breadcrumbs tab 310C to create one or more deception data objects 214. Once the user 260 selects the services tab 310C the campaign manager 216 presents an interface for creating one or more deception data objects 214 to allow the user 260 to select the a template representing a type of a data object for creating the deception data object 214. The user 260 may further assign a name designating the created deception data object 214 and/or define a relationship (interaction) between the created deception data object 214 and one or more of the deception applications 212. As shown in the exemplary screenshot 300C, the user 260 selected a template of a Network share for a deception data object 214 designated "Personnel_Files_BC" that is included in a breadcrumbs group designated "HR_bc_group" and connected to the SMB deception application 212 "Personnel_Files" that is part of the services group "HR_Services".

The screen shot 300D presents an interface for generating a script for deploying the created deception data object(s) 214. While the breadcrumbs tab 310C is presented, the user 260 may select the generate button presented by the interface. The campaign manager 216 may then generate a script that when executed by one or more of the endpoints 220 will create the created deception data object 214 on the respective endpoint(s) 220. The campaign manager 216 may create a script that once executed by the endpoint 220 deletes itself leaving no traces on the endpoint 220.

Once the deception data objects 214 are deployed, the deception environment is operational and the relationships between the deception data objects 214, the deception application(s) 212 and the decoy OS(s) 210 are applicable.

Figure 4:
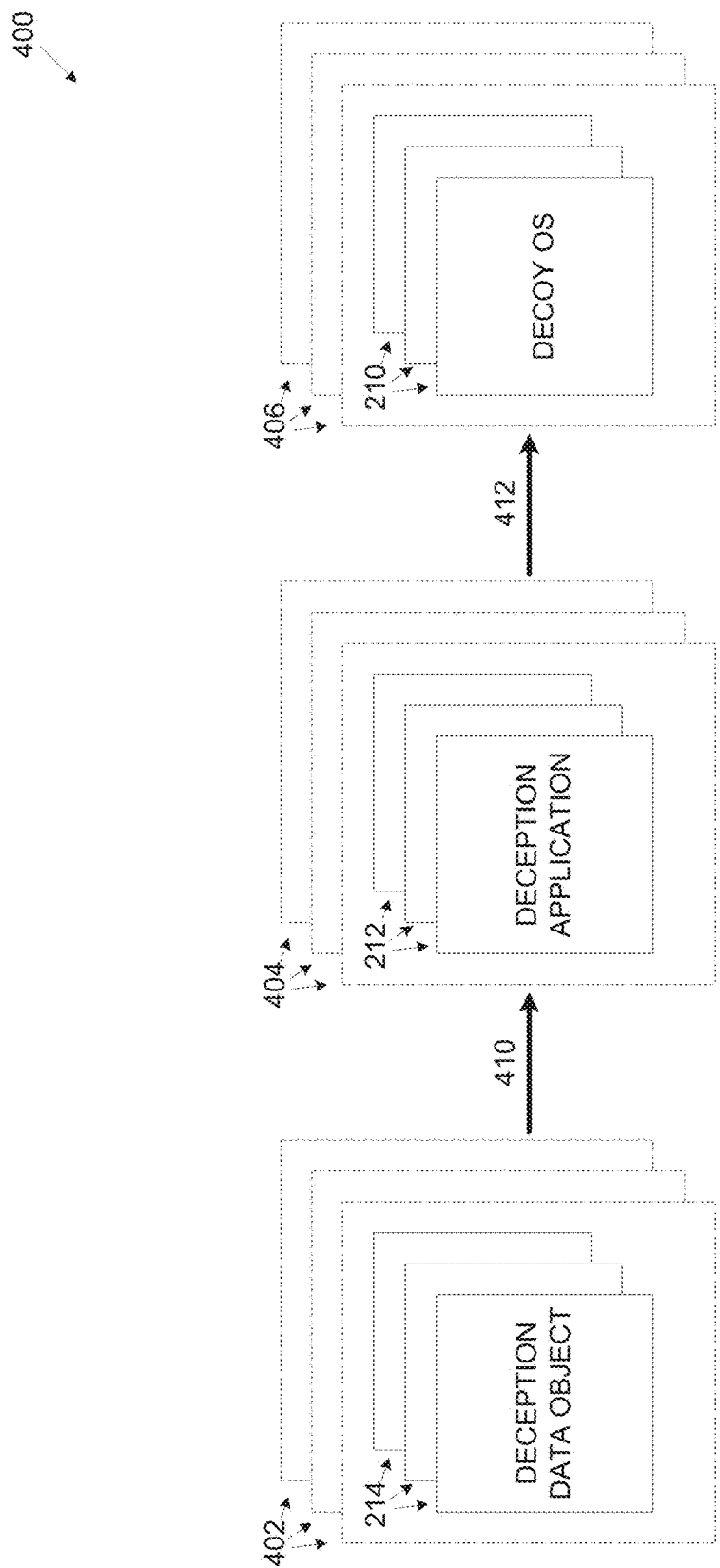
FIG. 4 is a block diagram of exemplary building blocks of a deception environment for detecting potential unauthorized operations in a protected network, according to some embodiments of the present invention.

Reference is now made to FIG. 4, which is a block diagram of exemplary building blocks of a deception environment for detecting potential unauthorized operations in a protected network, according to some embodiments of the present invention. A deception environment 400 created using a campaign manager such as the campaign manager 216 comprises a plurality of deception data objects 214 deployed on one or more endpoints such as the endpoints 220 in a protected network such as the protected network 235. The campaign manager 216 is used to define relationships 410 between each of the deception data items 214 and one or more of a plurality of deception applications 212. The campaign manager 216 is also used to define relationships 412 between each of the deception applications 212 and one or more of a plurality of decoy OSs 210. The deception data objects 214, the deception applications 212 and/or the decoy OSs 210 may be arranged in one or more groups 402, 404 and/or 406 respectively according to one or more of the characteristics of the protected network 235. Once deployed, operations that use data available in the deception data objects 214 interact with the deception application(s) 212 according to the defined relationships 410 that in turn interact with the decoy OS(s) 210 according to the defined relationships 412. The defined relationships 410 and/or 412 may later allow detection of one or more unauthorized operations by monitoring and analyzing the interaction between the deception data objects, the deception applications 212 and/or the decoy OSs 210.

Figure 5:
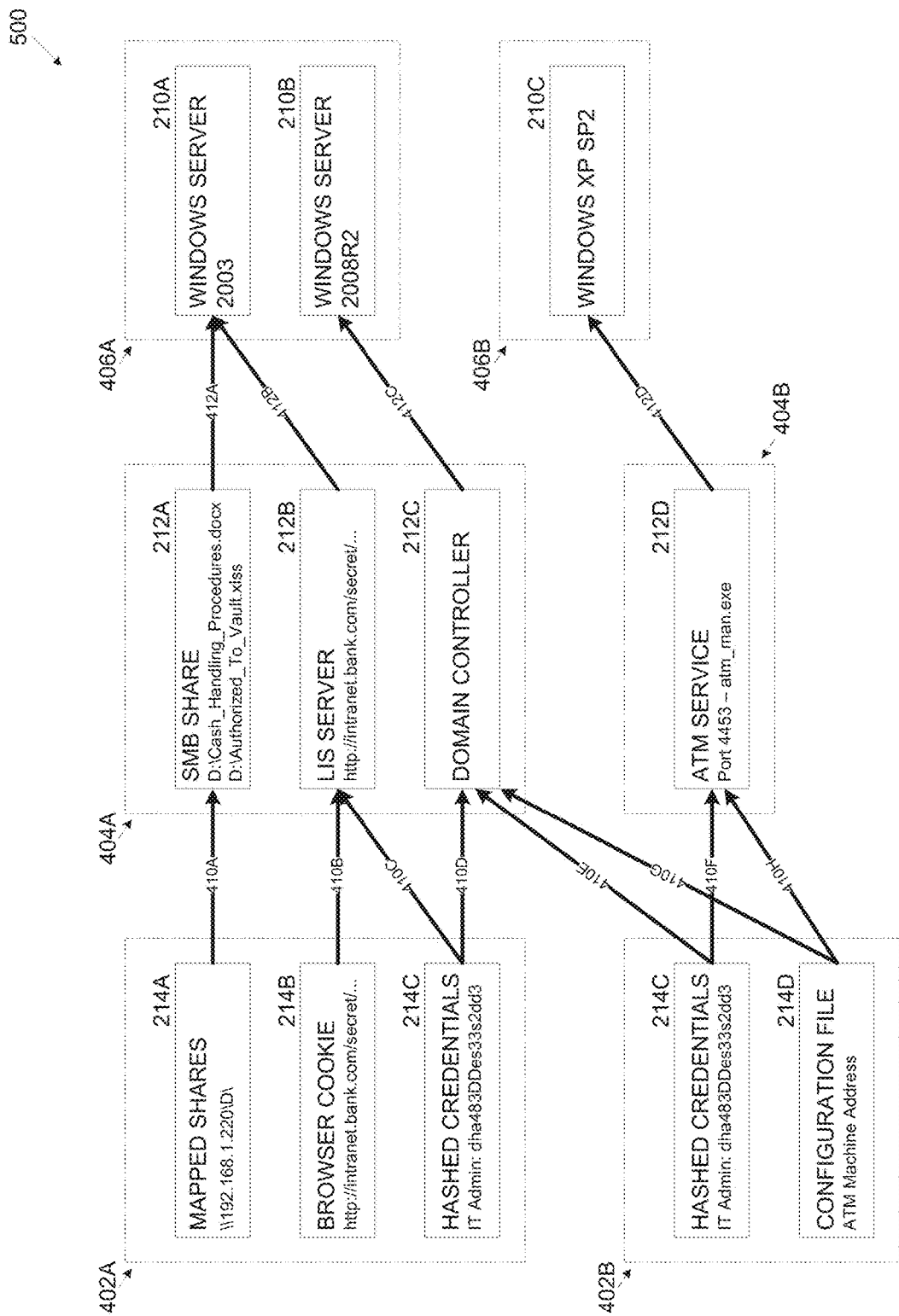
FIG. 5 is a block diagram of an exemplary utilization of deception environment building blocks for detecting potential unauthorized operations in a protected network, according to some embodiments of the present invention.

Reference is now made to FIG. 5, which is a block diagram of an exemplary utilization of deception environment building blocks for detecting potential unauthorized operations in a protected network, according to some embodiments of the present invention. Using a campaign manager such as the campaign manager 216, an exemplary deception environment 500 is created and launched to protect a bank. The network of the bank such as the network 230 is typically divided to two segments (groups), the internal office network comprising a plurality of workstations used by employees and a network for Automatic Teller Machines (ATMs) that are available to customers. Both the workstations and the ATMs are exemplary endpoints such as the endpoint 220 and/or the client terminal 221. A potential attacker may start his lateral movement in the network 230 of the bank from either one of the two network segments. To protect the network 230 of the bank, the deception environment 500 is created to comprise two groups A and B each directed at one of two main deception "stories", a first story for the ATM machines network and a second story for the internal network comprising the workstations.

For the internal network, a plurality of deception data objects (breadcrumbs) such as the deception data objects 214 that are grouped in a group 402A are deployed on each of the workstations. The deception data objects 214 deployed on the workstations may include, for example, an open share deception data object 214A for sharing and/or accessing various company documents, a browser cookie deception data object 214B for an internal company website and a hashed-credentials deception data object 214C used to access an internal company website and/or log into a faked domain. Similarly, for the ATM network, a plurality of deception data objects (breadcrumbs) such as the deception data objects 214 that are grouped in a group 402B are deployed on each of the ATMs. The deception data objects 214 deployed on the ATMs may include, for example, the hashed-credentials deception data object 214C and a configuration file deception data object 214D for a faked ATM service.

In order to support the breadcrumbs of the two groups 402A and 402B, relevant deception applications such as the deception applications 212 are created and launched. The deception applications 212 maybe divided to two groups 404A and 404B to interact with the deception data objects 214 of the internal network and the ATM network respectively. The group 404A may include, for example:

An SMB share deception application 212A to interact with the open share deception data object 214A. Interaction and/or relationship 410A may be defined for the interaction between the deception data object 214A and the deception application 212A.

A Location Information Server (LIS) deception application 212B to interact with the browser cookie deception data object 214B and/or the hashed-credentials deception data object 214C. Interaction and/or relationship 410B and/or 410C may be defined for the interaction of the deception data object 214B and the deception data object 214C respectively with the deception application 212B.

A domain controller deception application 212C providing the fake domain and interacting with the hashed-credentials deception data object 214C and/or the configuration file deception data object 214D. Interaction and/or relationship 410D, 410E and/or 410G may be defined for the interaction of the deception data object 214C of the group 402A, the deception data object 214C of the group 402B and the deception data object 214D respectively with the deception application 212C.

The group 404B may include, for example an ATM service deception application 212D utilizing the faked ATM service and interacting with the deception data object 214C of the group 402B and the configuration file deception data object 214D. Interaction and/or relationship 410F and/or 410H may be defined for the interaction of the deception data object 214C and the deception data object 214D respectively with the deception application 212D.

The deception applications 212A through 212D are hosted by decoy OSs such as the decoy OS 210. In the exemplary deception environment 500, the SMB share deception application 212A and the LIS server deception application 212B are hosted by a Windows Server 2003 decoy OS 210A while the domain controller deception application 212C is hosted by a Windows Server 2008R2 decoy OS 210B. To maintain the groups partitioning, the Windows Server 2003 decoy OS 210A and the Windows Server 2008R2 decoy OS 210B are grouped together in a group 406A. The ATM service deception application 212D is hosted by a Windows XP SP2 decoy OS 210C that is associated with a group 406B. Interaction and/or relationship 412A and/or 412B may be defined for the interaction of the deception application 212A and the deception application 212B respectively with the decoy OS 210A. Interaction and/or relationship 412C may be defined for the interaction of the deception application 212C with the decoy OS 210B. Interaction and/or relationship 412C may be defined for the interaction of the deception application 214C with the decoy OS 210B. Interaction and/or relationship 412D may be defined for the interaction of the deception application 212D with the decoy OS 210C.

Reference is made once again to FIG. 1. As shown at 112, the campaign manager 216 updates dynamically and continuously the deception environment and/or the deception data objects 214 deployed on the endpoints 220. The deception environment is constantly updated to make the deception data objects 214 seem as valid data objects to the potential attacker. As part of updating the deception environment, the campaign manager 216 update usage indication(s), for example, footprints, traces, access residues, log records and/or the like in the respective deception applications 212 indicating usage of the deception data objects 214. The campaign manager 216 update usage indication(s) to create an impression (impersonate) that the deception data objects 214 are valid and/or real data objects used by users, applications, services and/or the like in the protected network 235.

The campaign manager 216 may use one or more automated tools, for example, scripts to update the deception environment and/or the deception data objects 214. The campaign manager 216 may apply a schedule for updating the deception environment. Optionally, the campaign manager 216 updates the deception environment according to a behavioral pattern of the potential attacker such that the deception data objects are adapted to trap the potential attacker.

As shown at 114, the campaign manager 216 continuously monitors the protected network 235 in order to detect the potential attacker. The potential attacker may be detected by identifying one or more unauthorized operations that are initiated in the protected network 235. The unauthorized operation(s) may be initiated by a user, a process, a utility, an automated tool, an endpoint and/or the like. The unauthorized operation(s) may originate within the protected network 235 and/or from a remote location accessing the protected network 235 over the network 230 and/or the internet 240. In order to identify the unauthorized operation(s), the campaign manager 216 monitors the decoy OS(s) 210 and/or the deception applications 212 at one or more levels and/or layers, for example:

Network monitoring in which the campaign manager 216 monitors egress and/or ingress traffic at one or more of the endpoints 220. The campaign manager 216 may further record the monitored network traffic.

Log monitoring in which the campaign manager 216 monitors log records created by one or more of the deception application(s) 212.

OS monitoring in which the campaign manager 216 monitors interaction made by one or more of the deception applications 212 with the decoy OS(s) 210.

Kernel level monitoring in which the campaign manager 216 monitors and analyzes activity at the kernel level of the decoy OS(s) 210.

As shown at 116, the campaign manager 216 analyzes the monitored data and/or activity to detect the unauthorized operation that may indicate of the potential attacker. Based on the analysis, the campaign manager 216 creates one or more of a plurality of detection events, for example, a touch event, an interaction event, a code execution event, an OS interaction event and/or a hardware interaction event. The analysis conducted by the campaign manager 216 may include false positive analysis to avoid identification of one or more operations initiated by one or more legitimate users, processes, applications and/or the like as the potential unauthorized operation.

The touch event(s) may be created when the campaign manager 216 detects network traffic on one or more ports.

The interaction events may be created the campaign manager 216 detects a meaningful interaction with one or more of the deception applications 212. The campaign manager 216 may create the interaction event when detecting usage of data that is included, provided and/or available from one or more of the deception data objects 214 for accessing and/or interacting with one or more of the deception applications 212. For example, the campaign manager 216 may create an interaction event when detecting an attempt to logon to a deception application 212 of type "remote desktop service" using credentials stored in a deception data object 214 of type "hashed credentials". Another example may be the campaign manager 216 may detect a file access on an SMB share deception application 212 where the file name is available from a deception data object 214 of type "SMB mapped shares". Additionally, the campaign manager 216 may create an interaction event when detecting interaction with the deception application(s) 212 using data that is available from valid data objects, i.e. not one of the deception data objects 214. For example, the campaign manager 216 may detect an HTTP request from an LIS deception application 212. Optionally, the campaign manager 216 may be configured to create interaction events when detecting one or more pre-defined interaction types, for example, logging on a specific deception application 212, executing a specific command, clicking a specific button(s) and/or the like. The user 260 may further define "scripts" that comprise a plurality of the pre-defined interaction types to configure the campaign manager 216 to create an interaction event at detection of complex interactions between one or more of the deception components, i.e. the decoy OS(s) 210, the deception application(s) 212 and/or the deception data object(s) 214.

The code execution events may be created when the campaign manager 216 detects that foreign code is executed on the underlying OS of one or more of the decoy OSs 210.

The OS interaction event may be created when the campaign manager 216 detects that one or more applications such as the applications 222 attempt to interact with one or more of the decoy OSs 210, for example, opening a port, changing a log and/or the like.

The hardware interaction event may be created when the campaign manager 216 detects that one or more of the decoy OSs 210 and/or the deception applications 212 attempts to access one or more hardware components of the hardware platform on which the decoy OSs 210 and/or the deception applications 212 are executed.

Using the campaign manager 216 the user 260 may define complex sequence comprising a plurality of events to identify more complex operations and/or interaction detected with the deception components. Defining the complex sequences may further serve to avoid the false positive identification.

Optionally, the campaign manager 216 creates an activity pattern of the potential attacker by analyzing the identified unauthorized operation(s). Using the activity pattern, the campaign manager 216 may gather useful forensic data on the operations of the potential attacker and may classify the potential attacker in order to estimate a course of action and/or intentions of the potential attacker. The campaign manager 216 may than adapt the deception environment to tackle the estimated course of action and/or intentions of the potential attacker.

Optionally, the campaign manager 216 employs one or more machine learning processes, methods, algorithms and/or techniques on the identified activity pattern. The machine learning may serve to increase the accuracy of classifying the potential attacker based on the activity pattern. The machine learning may further be used by campaign manager 216 to adjust future deception environments and deception components to adapt to the learned activity pattern(s) of a plurality of potential attacker(s).

As shown at 118, the campaign manager 216 generates one or more alerts following the detection event indicting the potential unauthorized operation. The user 260 may configure the campaign manager 216 to set an alert policy defining one or more of the events and/or combination of events that trigger the alert(s). The campaign manager 216 may be configured during the creation of the detection campaign and/or at any time after the deception campaign is launched. The alert may be delivered to the user 260 monitoring the campaign manager 216 and/or through any other method, for example, an email message, a text message, an alert in a mobile application and/or the like.

The campaign manager 216 and/or the deception environment may be further configured to take one or more additional actions following the alert. One action may be pushing a log of potential unauthorized operation(s) using one or more external applications and/or services, for example, syslog, email and/or the like. The log may be pushed with varying levels of urgency according to the policy defined for the deception campaign. The external system(s) in turn may take additional actions such as, for example, mitigating the potential threat by blocking executables detected as malware, block network access to compromised endpoints 220 and/or the like. Another action may be taking a snapshot of the affected decoy OSs 210 and/or deception applications 212 and turn them off in order to limit the potential attacker's ability to use the decoy OS s 210 and/or the deception applications 212 as a staging point for further action(s). The snapshot may serve for later forensic analysis to analyze the data captured before and during the attack until the turn off time. Yet another action may be to trigger call back function(s) to one or more clients using an API supported by the deception environment. Details of the attack may be relayed to the client(s) that may be configured with user-defined procedure(s) and/or direction(s) to take further action. For example, the client(s) may use the API of the deception environment to create, launch and/or deploy one or more additional deception elements, for example, the decoy OS 210, the deception application 212 and/or the deception data object 214.

Optionally, the campaign manager 216 presents the user(s) 260 with real time and/or previously captured status information relating to the deception campaign(s), for example, created events, detected potential attackers, attack patterns and/or the like. The campaign manager 216 may provide, for example, a dashboard GUI provided through the user interface 206. The campaign manager 216 may also presents the status information and/or through a remote access application, for example, a web browser and/or a local agent executed on one of the endpoints 220 and/or at a remote location accessing the campaign manager 216 remotely over the network 230 and/or the internet 240.

Figure 6A:
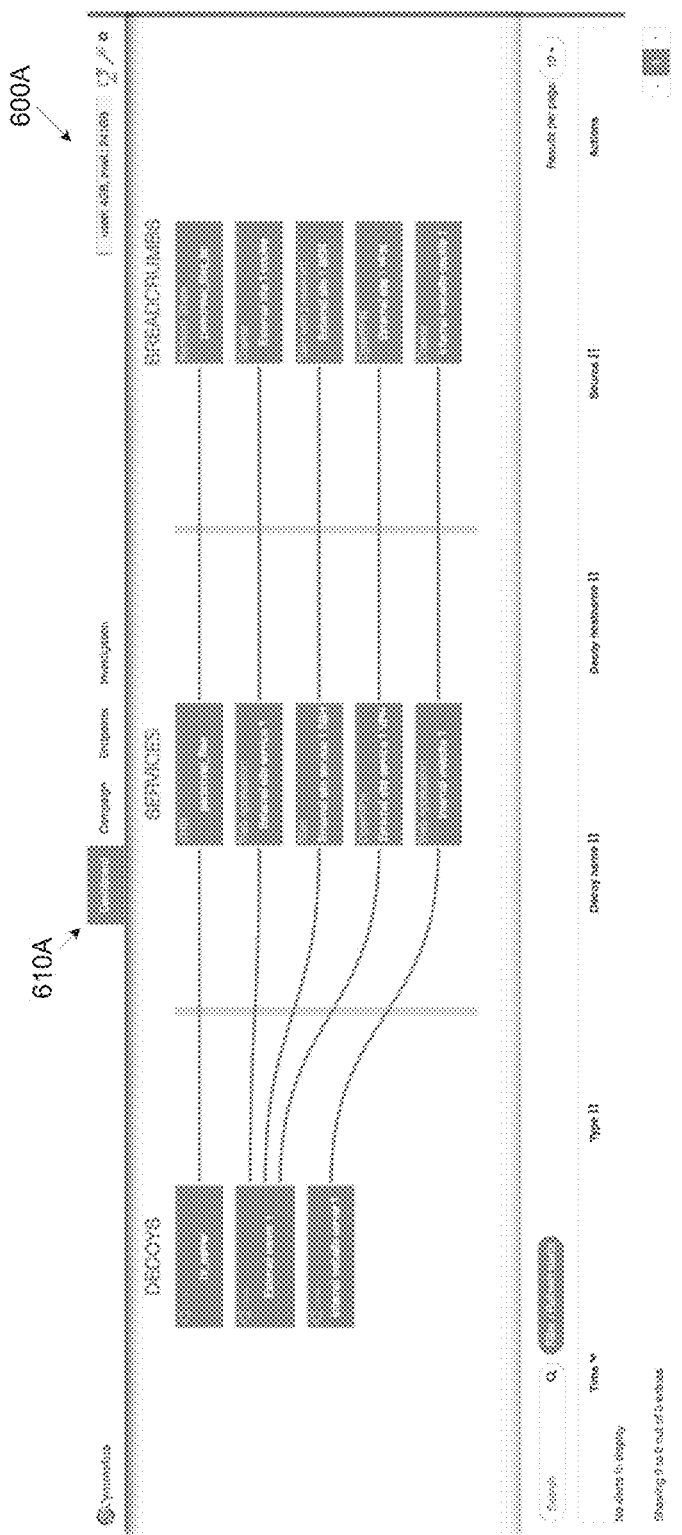
FIG. 6A is a screenshot of an exemplary first status screen of a campaign manager dashboard presenting structural information of a deception campaign, according to some embodiments of the present invention.

Reference is now made to FIG. 6A, which is a screenshot of an exemplary first status screen of a campaign manager dashboard presenting structural information of a deception campaign, according to some embodiments of the present invention. A screenshot 600A describing a deception campaign may be presented to one or more users such as the user 260 through a GUI of a campaign manager such as the campaign manager 216. The user 260 may select a campaign tab 610A to show an overall view of the deception campaign launched in the protected network 235. Once the user 260 selects the campaign tab 610A the campaign manager 216 presents status information on the deception campaign. The campaign manager 216 may present a structural diagram of the deception campaign including, for example, the deception components used during the deception campaign and/or the relationships (interactions) defined for each of the deception components. Furthermore, through the provided interface, the user 260 may define the type of events that may trigger alerts.

Figure 6B:
FIG. 6B is a screenshot of an exemplary second status screen of a campaign manager dashboard for investigation potential threats detected during a deception campaign, according to some embodiments of the present invention.

Reference is also made to FIG. 6B, which is a screenshot of an exemplary second status screen of a campaign manager dashboard for investigation potential threats detected during a deception campaign, according to some embodiments of the present invention. The user 260 may select an investigation tab 610B to show potential threats, for example, unauthorized operation(s), suspected interactions and/or the like that may indicate of a potential attackers operating within the protected network 235. Once the user 260 selects the investigation tab 610B the campaign manager 216 presents status information on potential threats. Each entry may present one or more potential; threats and the user 260 may select any one of the entries to investigate further the nature f the potential threat.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of detecting unauthorized access to a protected network by monitoring a dynamically updated deception environment, comprising:

launching, on at least one decoy endpoint, at least one decoy operating system (OS) managing at least one of a plurality of deception executed in a protected network;

emulating usage of a plurality of deception data objects deployed in the protected network by dynamically and continuously updating a usage indication of said plurality of deception data objects, said plurality of deception data objects used for accessing said at least one deception applications and are configured to trigger an interaction with said at least one deception application when used;

as a result of at least one potential unauthorized operation within said protected network, detecting usage of data contained in at least one of said plurality of deception data objects by monitoring said interaction; and identifying said at least one potential unauthorized operation based on analysis of said detection;

wherein each of said plurality of deception data objects emulates a valid data object used for interacting with said at least one application;

wherein said usage indication comprises creating an impression that said plurality of deception data objects are used to interact with said at least one deception application;

wherein said analysis further comprising preventing false positive analysis to avoid identifying at least one legitimate operation as said at least one potential unauthorized operation.

2. The computer implemented method of claim 1, wherein said decoy endpoint is a member selected from a group consisting of: a physical device comprising at least one processor and a virtual machine.

3. The computer implemented method of claim 2, wherein said virtual machine is hosted by at least one member selected from a group consisting of: a local endpoint, a cloud service and a vendor service.

4. The computer implemented method of claim 1, wherein each of said plurality of deception data objects is a member selected from a group consisting of: a hashed credentials object, a browser cookie, a registry key, a Server Message Block (SMB) mapped share, a Mounted Network Storage element, a configuration file for remote desktop authentication credentials, a source code file with embedded database authentication credentials and a configuration file to a source-code version control system.

5. The computer implemented method of claim 1, wherein said at least one potential unauthorized operation is initiated by a member selected from a group consisting of: a user, a process, an automated tool and a machine.

6. The computer implemented method of claim 1, wherein each of said plurality of applications is a member selected from a group consisting of: an application, a tool, a local service and a remote service.

7. The computer implemented method of claim 1, wherein each of said plurality of deception applications is selected by at least one of: a user and an automated tool.

8. The computer implemented method of claim 1, wherein said monitoring comprises at least one of:

monitoring network activity of at least one of said plurality of deception applications, monitoring interaction of said at least one deception application with said at least one decoy operating system, monitoring at least one log record created by said at least one deception application, and monitoring interaction of at least one of said plurality of deception applications with at least one of a plurality of hardware components in said protected network.

9. The computer implemented method of claim 1, further comprising dividing at least one of: said at least one decoy operating system, said plurality of deception applications and said plurality of deception data objects to a plurality of groups according to at least one characteristic of said protected network.

10. The computer implemented method of claim 1, further comprising providing a plurality of templates for creating at least one of: said at least one decoy operating system, said plurality of deception application and said plurality of deception data objects.

11. The computer implemented method of claim 10, wherein each of said plurality of templates further comprises a definition of a relationship between at least two of: said at least one decoy operating system, said plurality of deception application and said plurality of deception data objects.

12. The computer implemented method of claim 10, further comprising at least one of said plurality of templates is adjusted by at least one user adapting said at least one template according to at least one characteristic of said protected network.

13. The computer implemented method of claim 1, further comprising generating an alert at detection of said at least one potential unauthorized operation.

14. The computer implemented method of claim 1, further comprising generating an alert at detection of a combination of a plurality of potential unauthorized operations to detect a complex sequence of said interaction.

15. The computer implemented method of claim 1, further comprising analyzing said at least one potential unauthorized operation to identify an activity pattern.

16. The computer implemented method of claim 15, further comprising applying a learning process on said activity pattern to classify said activity pattern in order to increase an accuracy of classifying at least one future potential unauthorized operation, based on said activity pattern.

17. A system for detecting unauthorized access to a protected network by monitoring a dynamically updated deception environment, comprising:

a program store storing a code; and at least one hardware processor on at least one decoy endpoint coupled to said program store for executing said stored code, wherein when said code is executed by said at least one hardware processor, it causes said at least one hardware processor to: launch at least one decoy operating system (OS) managing at least one of a plurality of deception applications executed in a protected network;

emulate usage of a plurality of deception data objects deployed in said protected network by dynamically and continuously updating a usage indication of said plurality of deception data objects, said plurality of deception data objects used for accessing said at least one deception application and are configured to trigger an interaction with said at least one deception application when used;

detect, as a result of at least one potential unauthorized operation within said protected network, usage of data contained in at least one of said plurality of deception data objects by monitoring said interaction; and identify said at least one potential unauthorized operation based on an analysis of said detection;

wherein each of said plurality of deception data objects emulates a valid data object used for interacting with said at least one application;

wherein said usage indication comprises creating an impression that said plurality of deception data objects are used to interact with said at least one deception application;

wherein said analysis further comprising preventing false positive analysis to avoid identifying at least one legitimate operation as said at least one potential unauthorized operation.

* * * * *